US011479955B2

(12) United States Patent
Chong et al.

(10) Patent No.: US 11,479,955 B2
(45) Date of Patent: Oct. 25, 2022

(54) WATER CENTER APPLIANCE AND AIO FAUCET

(71) Applicant: Elkay Manufacturing Company, Oak Brook, IL (US)

(72) Inventors: Jonathan Chong, Chicago, IL (US); Jason Silverstein, Palatine, IL (US)

(73) Assignee: Elkay Manufacturing Company, Oak Brook, IL (US)

( * ) Notice: Subject to any disclaimer, the term of this patent is extended or adjusted under 35 U.S.C. 154(b) by 0 days.

(21) Appl. No.: 16/746,086

(22) Filed: Jan. 17, 2020

(65) Prior Publication Data

US 2020/0277768 A1 Sep. 3, 2020

Related U.S. Application Data

(60) Provisional application No. 62/811,799, filed on Feb. 28, 2019.

(51) Int. Cl.
*E03C 1/326* (2006.01)
*E03C 1/182* (2006.01)
*C02F 1/00* (2006.01)

(52) U.S. Cl.
CPC .............. *E03C 1/326* (2013.01); *C02F 1/003* (2013.01); *E03C 1/182* (2013.01); *C02F 2209/445* (2013.01)

(58) Field of Classification Search
CPC .......... E03C 1/326; E03C 1/182; C02F 1/003; C02F 2209/445; A47B 77/04; B01D 35/143
USPC ............................................................ 4/630
See application file for complete search history.

(56) References Cited

U.S. PATENT DOCUMENTS

| 3,184,064 | A | * | 5/1965 | Miller | C02F 1/003 |
| | | | | | 210/287 |
| 3,292,983 | A | * | 12/1966 | Service | A47B 88/48 |
| | | | | | 312/328 |
| 4,369,532 | A | | 1/1983 | Houchins et al. | |
| 4,515,692 | A | * | 5/1985 | Chandler | C02F 1/003 |
| | | | | | 210/288 |
| 5,858,215 | A | * | 1/1999 | Burchard | C02F 1/003 |
| | | | | | 137/551 |
| 5,876,610 | A | * | 3/1999 | Clack | B01D 35/143 |
| | | | | | 73/1.28 |
| 6,306,290 | B1 | * | 10/2001 | Rolfes | B01D 35/143 |
| | | | | | 210/138 |

(Continued)

OTHER PUBLICATIONS

BARAZZA s.r.l. 123 CM SINK-BLOCK. 6 pages. Retrieved on Jul. 15, 2021 from https://www.barazzasrl.it/en/prodotto_classico/123-cm-sink-block/.

*Primary Examiner* — Benjamin R Shaw
(74) *Attorney, Agent, or Firm* — Neal, Gerber & Eisenberg LLP; Tanvi Patel

(57) ABSTRACT

An example water center appliance configured to incorporate various features associated with a sink is provided. An example water center appliance includes a top section and a bottom section. In one example embodiment, the top section includes a sink basin, a faucet, a water filter assembly, a water inlet connection, and an electricity connection. In one example embodiment, the bottom section includes a first sliding drawer, and a second sliding drawer, wherein the first sliding drawer and the second sliding drawer are shaped to accommodate one or more components of the top section.

18 Claims, 47 Drawing Sheets

(56) References Cited

U.S. PATENT DOCUMENTS

| | | | |
|---|---|---|---|
| 6,711,525 B1* | 3/2004 | Fox | B01D 35/143 |
| | | | 702/184 |
| 6,726,296 B2* | 4/2004 | McGilton | A47B 77/06 |
| | | | 312/278 |
| 6,938,283 B1 | 9/2005 | Martinez | |
| 9,422,173 B1* | 8/2016 | Spiegel | C02F 1/68 |
| 10,471,375 B1* | 11/2019 | Zerban | B01D 35/143 |
| 2003/0041373 A1 | 3/2003 | Blazevich | |
| 2005/0099101 A1* | 5/2005 | Lowe | A47B 67/04 |
| | | | 312/228 |
| 2005/0285488 A1 | 12/2005 | Lizeil | |
| 2006/0207920 A1* | 9/2006 | Lackey | B01D 35/143 |
| | | | 210/95 |
| 2007/0114893 A1* | 5/2007 | Styka | A47B 88/40 |
| | | | 312/228 |
| 2008/0079339 A1* | 4/2008 | Hall | A47B 88/443 |
| | | | 312/228 |
| 2008/0191070 A1* | 8/2008 | Hanson | E03C 1/2665 |
| | | | 241/46.013 |
| 2011/0079037 A1* | 4/2011 | Snider | F25D 23/00 |
| | | | 62/67 |
| 2011/0145988 A1* | 6/2011 | Le Duff | A47B 77/06 |
| | | | 4/630 |
| 2011/0278207 A1* | 11/2011 | Swain | C02F 1/003 |
| | | | 210/91 |
| 2014/0223715 A1 | 8/2014 | Bippus et al. | |
| 2015/0251922 A1* | 9/2015 | Schuster | B01D 29/50 |
| | | | 210/323.1 |
| 2016/0016299 A1* | 1/2016 | Ekeberg | B25B 27/14 |
| | | | 29/271 |
| 2016/0060135 A1* | 3/2016 | Huang | B01D 61/08 |
| | | | 210/652 |
| 2018/0044901 A1 | 2/2018 | Lloyd | |
| 2018/0106027 A1* | 4/2018 | Yang | A47K 10/48 |
| 2018/0117508 A1* | 5/2018 | Paluszewski | B01D 35/30 |
| 2018/0186655 A1* | 7/2018 | Cobb | E03C 1/0411 |
| 2018/0259202 A1 | 9/2018 | Kim et al. | |
| 2019/0010061 A1* | 1/2019 | Mayer | B01D 35/143 |
| 2020/0157789 A1* | 5/2020 | Awada | E03C 1/0412 |
| 2020/0199858 A1* | 6/2020 | Eilmus | E03C 1/182 |
| 2020/0284011 A1* | 9/2020 | Liu | B02C 25/00 |
| 2021/0052069 A1 | 2/2021 | Phan et al. | |

* cited by examiner

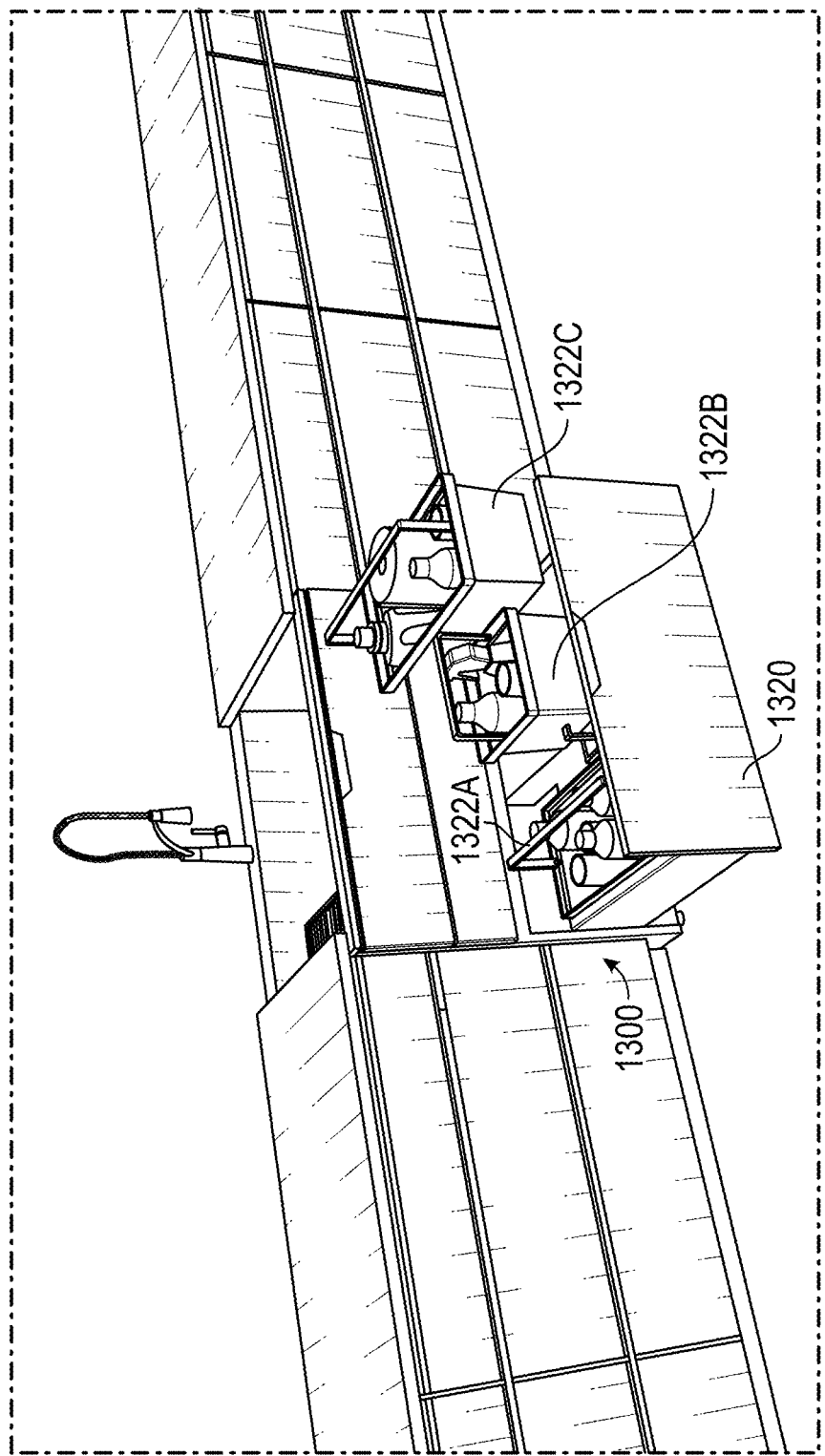

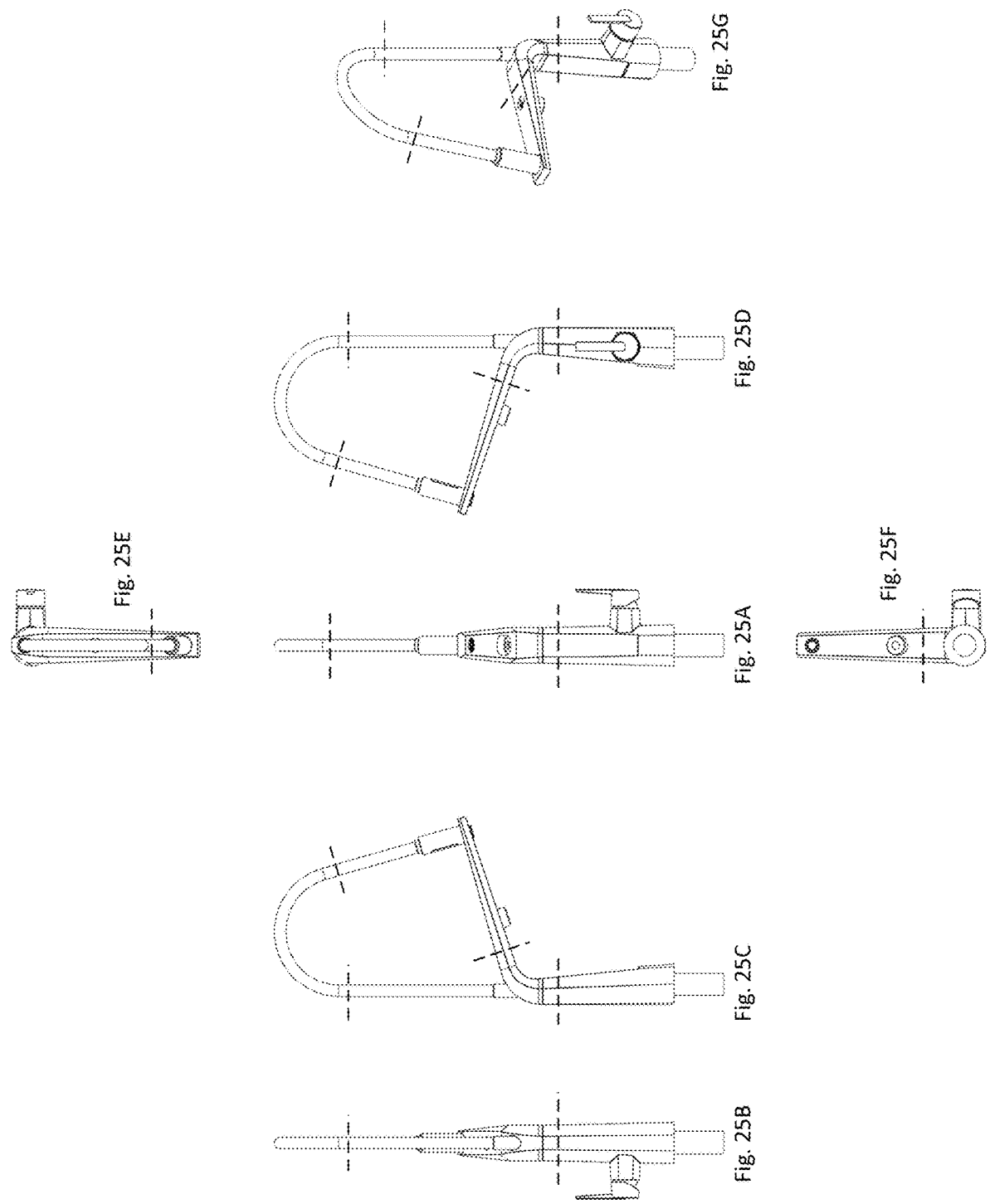

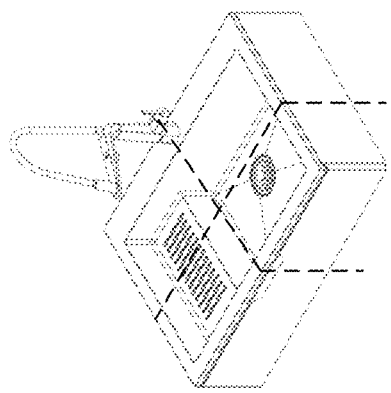
Fig. 28G
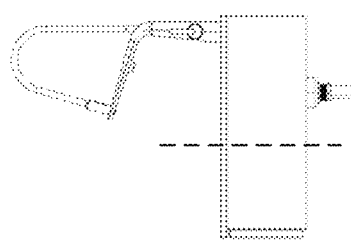
Fig. 29D
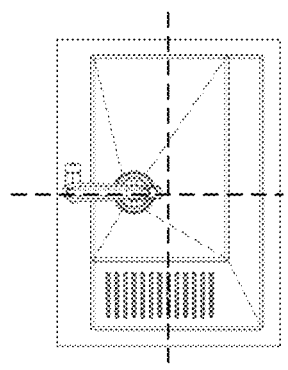
Fig. 29E
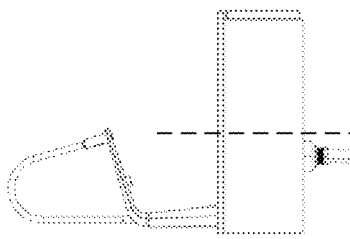
Fig. 29A
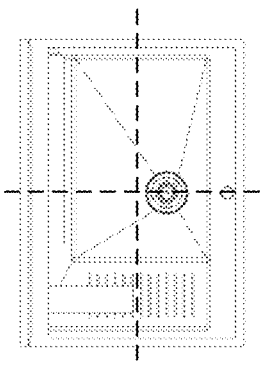
Fig. 29F
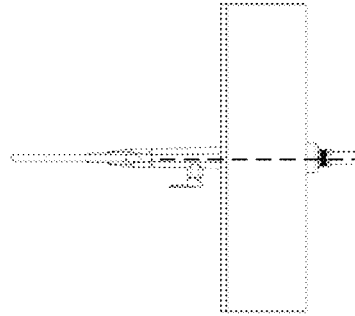
Fig. 29C
Fig. 29B

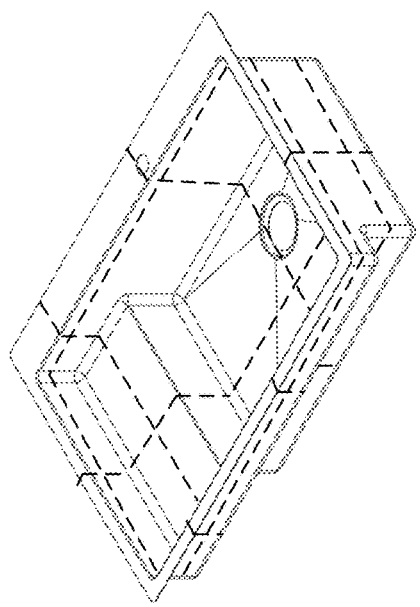
Fig. 31G
Fig. 31D
Fig. 31B
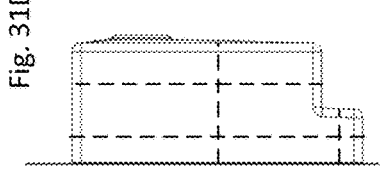
Fig. 31A
Fig. 31F
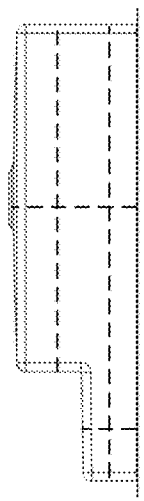
Fig. 31E
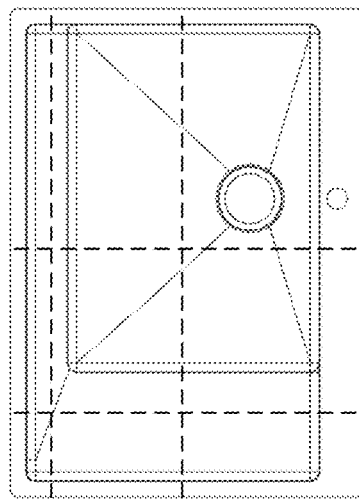
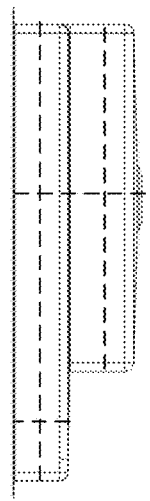
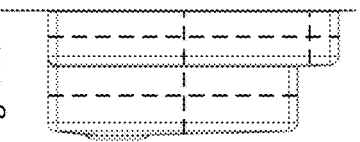
Fig. 31C

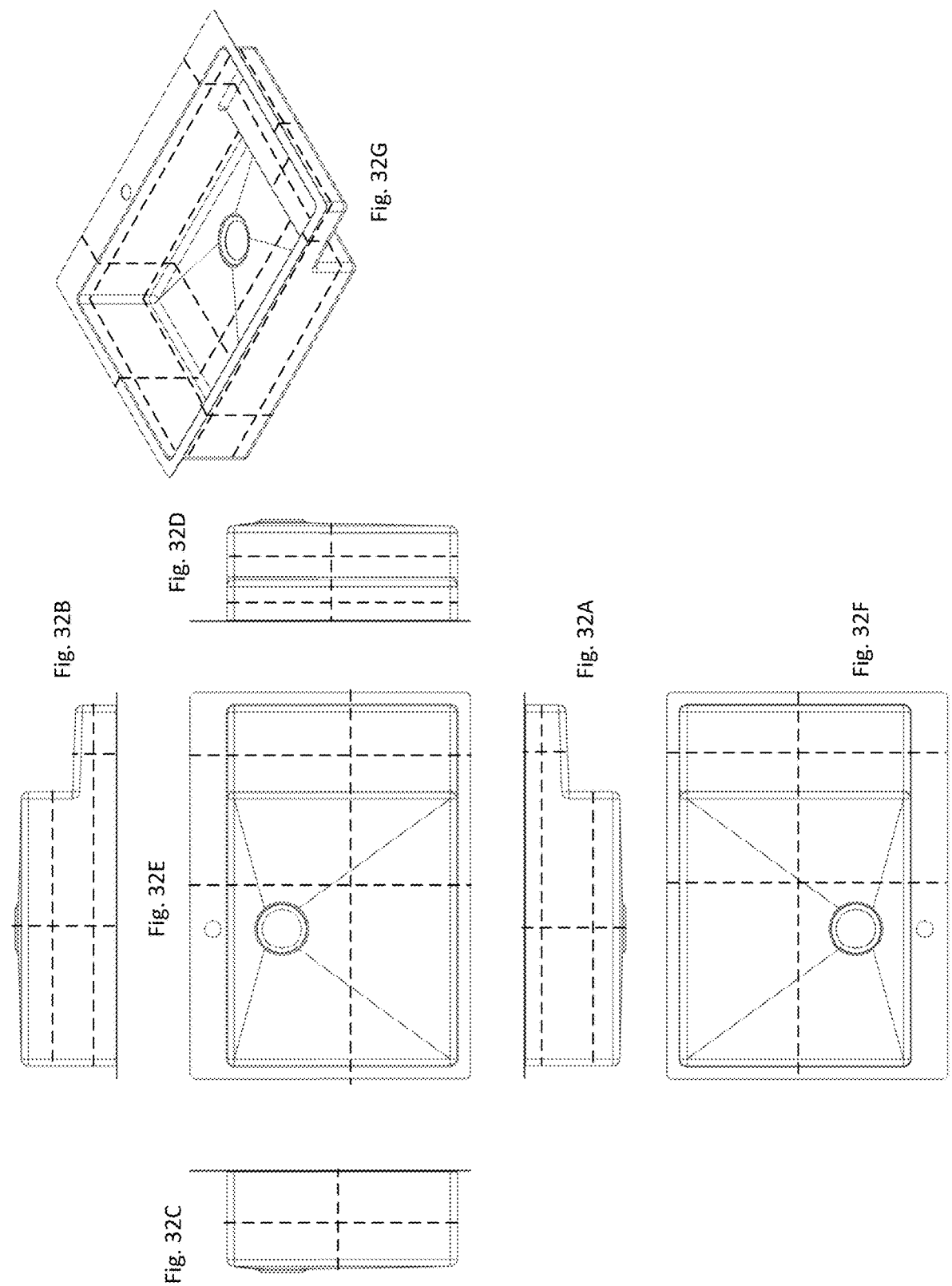

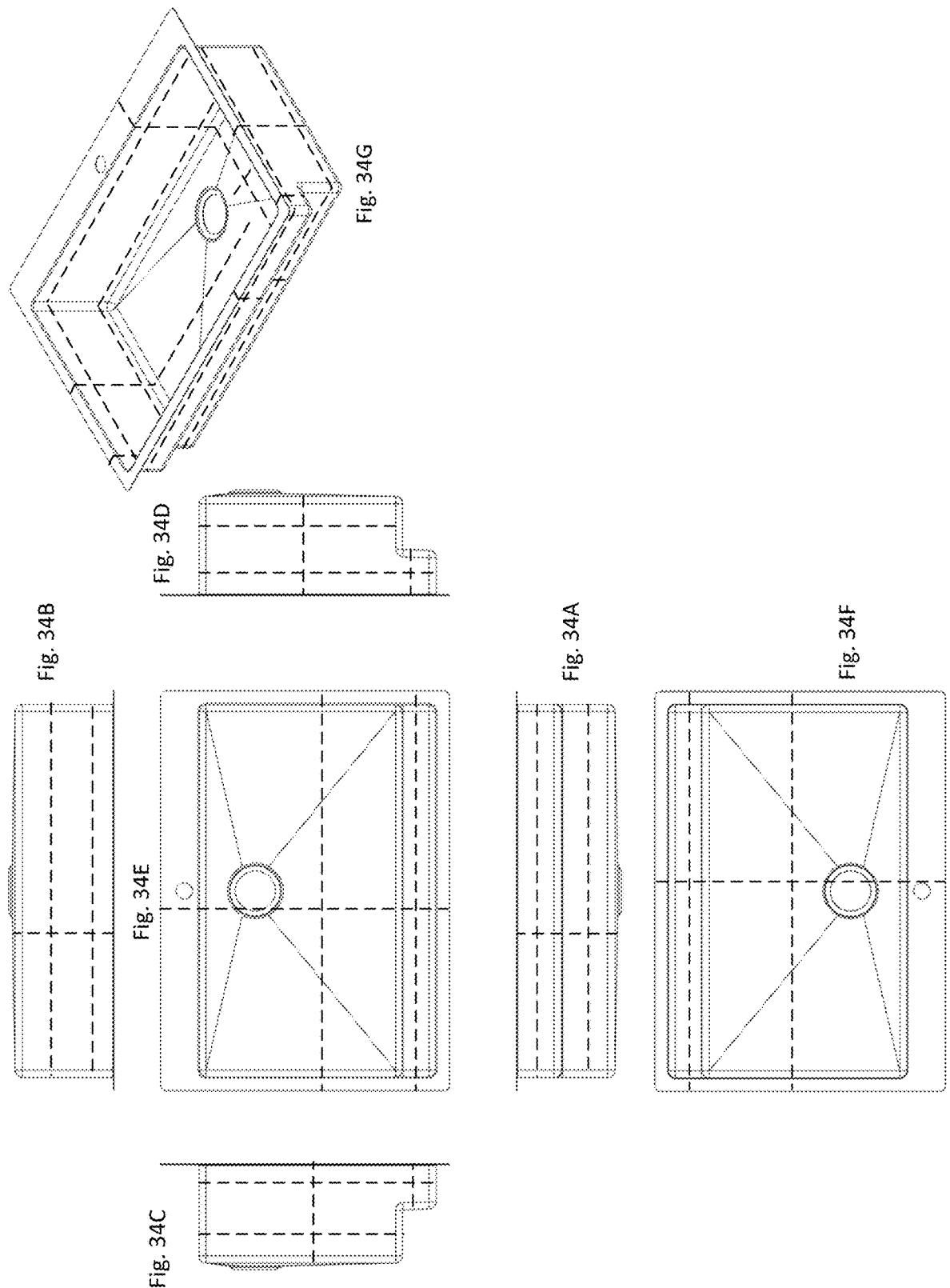

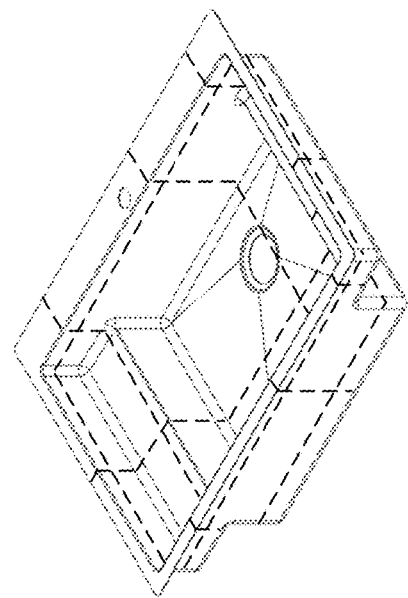
Fig. 35G
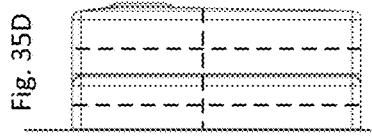
Fig. 35D
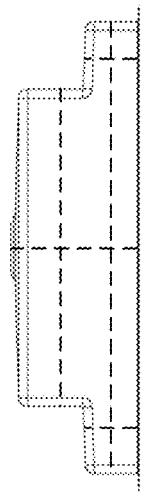
Fig. 35B
Fig. 35A
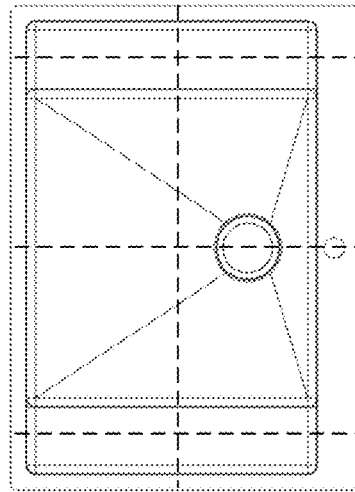
Fig. 35F
Fig. 35E
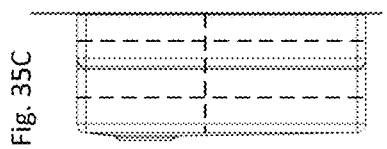
Fig. 35C

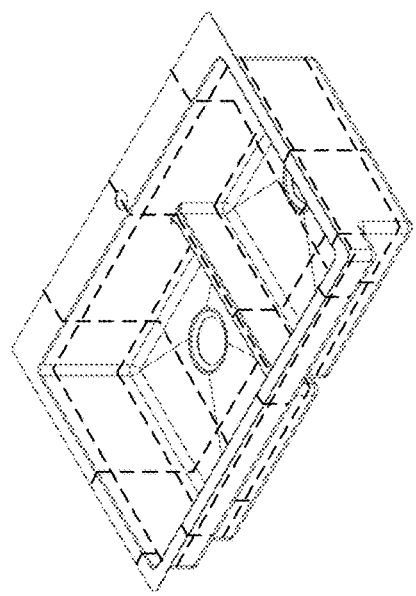
Fig. 37G
Fig. 37D
Fig. 37B
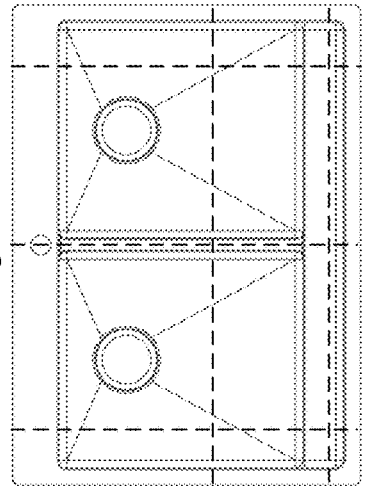
Fig. 37E
Fig. 37A
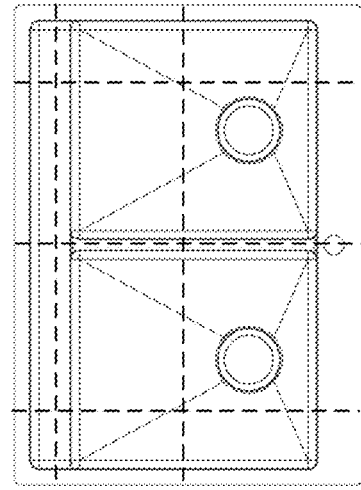
Fig. 37F
Fig. 37C

WATER CENTER APPLIANCE AND AIO FAUCET

CROSS REFERENCE TO RELATED APPLICATION

This application claims the benefit of and priority to U.S. Provisional Patent Application No. 62/811,799, filed Feb. 28, 2019, which is incorporated herein by reference in its entirety.

TECHNICAL FIELD

The present disclosure relates generally to a modular liquid dispensing systems, and more particularly to an appliance having functions that integrate the features of having (a) an all-in-one solution (e.g., providing a sink, drinking water delivery solution, faucet, and storage, and easy installation with pre routed plumbing in the unit), (b) optimized storage and organizational solutions, and (c) easy installation features with easy/quick connect plumbing connections.

BACKGROUND

Conventional sinks are typically constructed such that they fit into an existing countertop, either by laying the sink into a premade hole in the countertop (i.e., a top mount sink) or mounting the sink underneath the premade hole in the countertop (i.e., an under mount sink). The sink is installed separately from the cabinet, faucet, and other appliances. As such, construction of a typical kitchen, laundry room, or any suitable space, and installation of a sink in particular, can include multiple steps which must be completed in a particular order, and can involve making on-the-fly modifications to the countertop, cabinetry, sink, and/or other components to ensure that everything fits together properly.

SUMMARY

The present disclosure summarizes aspects of some contemplated embodiments, and should not be used to limit the scope of the claims. Other implementations are contemplated in accordance with the techniques described herein, as will be apparent to one having ordinary skill in the art upon examination of the following drawings and detailed description, and these implementations are intended to be within the scope of this application.

An example modular water center appliance is shown and described below. The construction of the water center may include a two piece design for the water center appliance, and the options to include one or more of unique sink designs, drinking water delivery solutions, faucet systems, and/or storage components, all with and easy installation with pre routed plumbing in the unit to modularize the design and optimize manufacturing and assembly processes. The example illustrated water center appliance includes a top section and a bottom section. Thus, in this example embodiment, the customer may purchase a full unit (i.e., both the top section and the bottom section) or a half unit (i.e., the top section only) for a farmhouse style cabinet installation. In one embodiment, the top section may include a sink basin, a water filter assembly, a water inlet connection, a faucet system, an electricity connection, and a flip down door for small item storage. As described in greater detail below, the present disclosure includes the option of utilizing a unique multipurpose faucet system in place of an ordinary faucet known in the art. In one embodiment, the bottom section may include a first sliding drawer and a second sliding drawer, wherein the first sliding drawer and the second sliding drawer are shaped to accommodate one or more components of the top section. The first and second sliding drawers are fitted with touch open and soft close slides. The water center appliance may also include a disposal, connections for a dishwasher, and various other components such as those described herein.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIGS. 24A-J illustrate an example water center appliance that includes the multipurpose faucet of FIGS. 23A-C, shown in various states of installation and with the drawers open and closed.

FIGS. 25A-G illustrate front, back, left, right, top, bottom, and perspective views of an example faucet.

FIGS. 29A-G illustrate front, back, left, right, top, bottom, and perspective views of an example modular top section of a water center appliance including a faucet.

FIGS. 31A-G illustrate front, back, left, right, top, bottom, and perspective views of an example sink basin with a left and front ledge.

FIGS. 32A-G illustrate front, back, left, right, top, bottom, and perspective views of an example sink basin with a right ledge.

FIGS. 34A-G illustrate front, back, left, right, top, bottom, and perspective views of an example sink basin with a front ledge.

FIGS. 35A-G illustrate front, back, left, right, top, bottom, and perspective views of an example sink basin with a left and right ledge.

FIGS. 37A-G illustrate front, back, left, right, top, bottom, and perspective views of an example sink with a dual basin and a front ledge.

DETAILED DESCRIPTION OF EXAMPLE EMBODIMENTS

Figure 1:
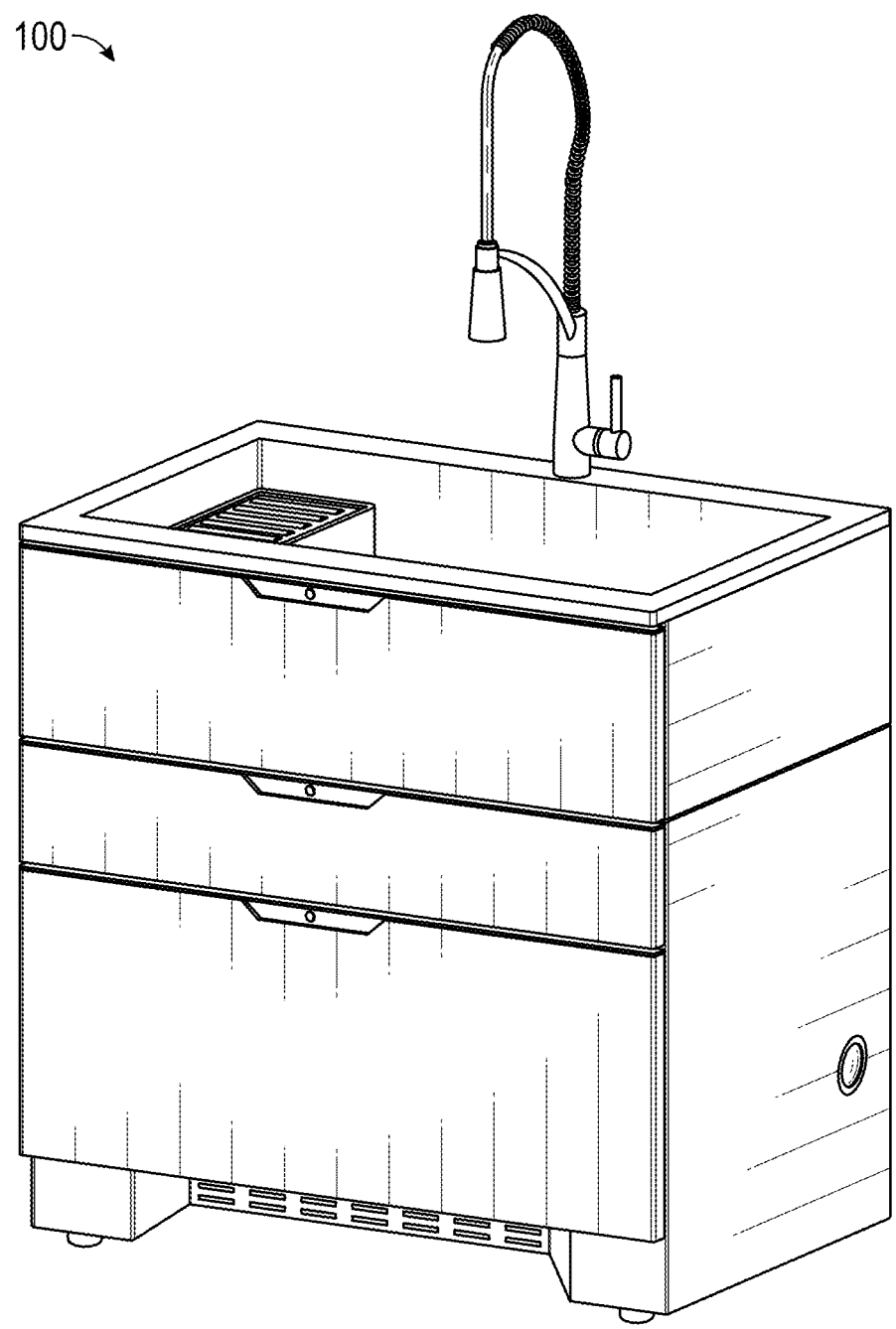
FIG. 1 illustrates an example water center appliance according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, many sinks are installed in kitchens, laundry rooms, or other locations separately from cabinetry, countertops, and other components of the space. It may be beneficial to incorporate some or all of the components associated with a sink into a single unit, referred to herein as a water center appliance. The water center appliance can then be installed similarly to a typical appliance such as a stove, without requiring special tools or complicated installation steps.

The water center appliance of the present disclosure can replace an existing sink, cabinetry, and more. The water center appliance can include a sink basin, faucet, water filter, water dispenser, disposal, display, cabinetry and more into a single unit having sliding drawers which can be used for storage. The water center appliance can be designed to act alone as a traditional fixture, or can operate in conjunction with other components such as a disposal, in order to accommodate accessories and other common items that are used along with a typical sink.

Figure 2:
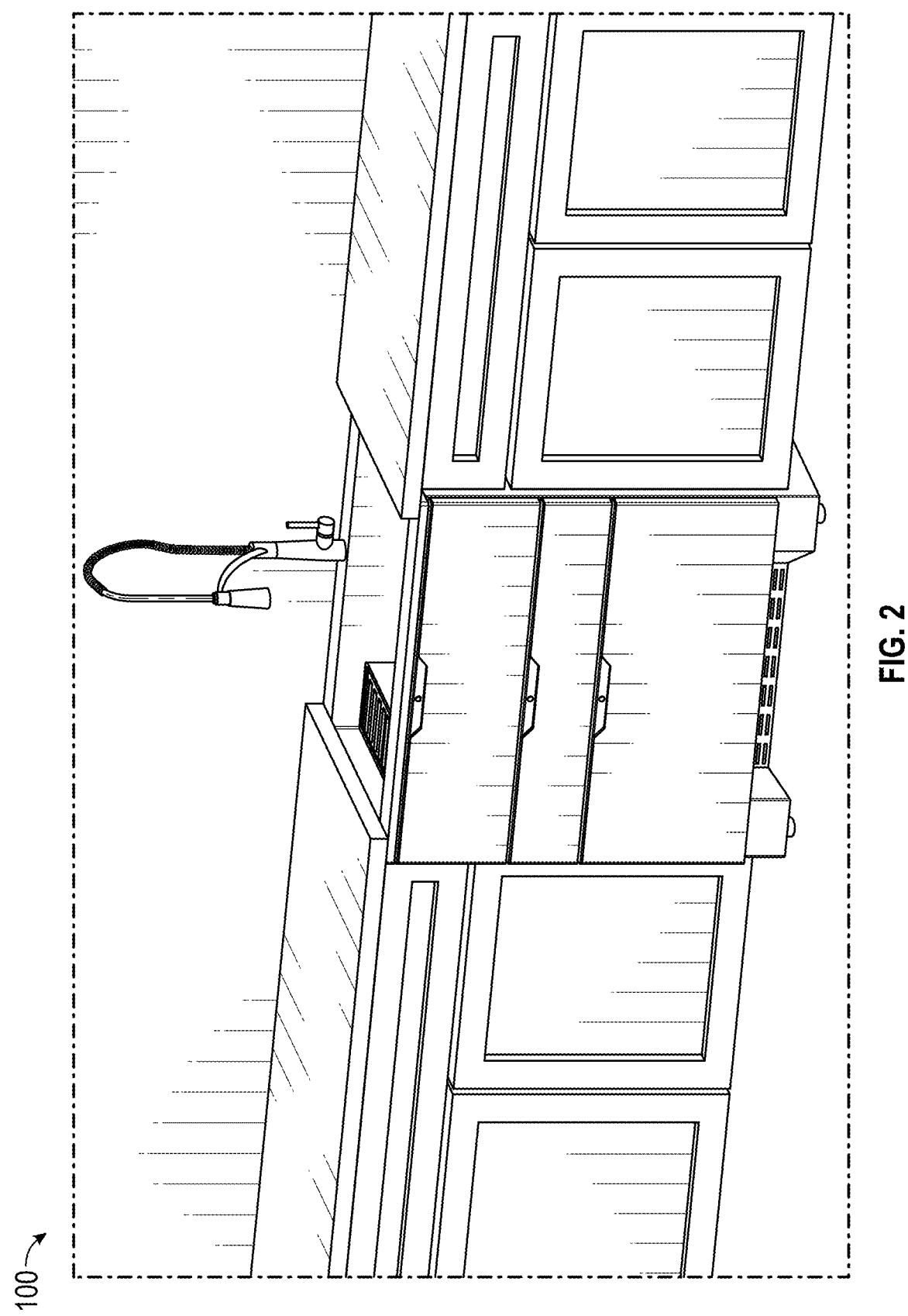
FIG. 2 illustrates an example embodiment of the example water center appliance of FIG. 1 installed in an example kitchen according to embodiments of the present disclosure.

FIGS. 1, 2, and 3 illustrate the water center appliance 100. FIG. 2 illustrates the water center appliance 100 installed in a kitchen, laundry room, or other suitable space, with cabinets positioned on either side of the water center appliance 100. In one example embodiment, the water center appliance 100 of FIG. 1 includes a stainless steel body with removable, interchangeable panels. The interchangeable panels may include a variety of colors and materials to allow for customization to any kitchen, laundry room or other space. It should be appreciated that the stainless steel embodiment is not intended to be limiting, and that the color, material, and/or finish of the water center appliance are interchangeable and may be constructed of any suitable color, material and/or finish.

As illustrated in FIG. 2, the water center appliance 100 can be installed similarly to an appliance such as a stove or dishwasher. The water center appliance can be adjusted in height to bring the top of the sink level with the top or bottom surfaces of the surrounding countertop. For example, the water center application may include leveling feet attached to the bottom corners. The leveling feet may be manipulated to adjust the height of the water center appliance 100 relative to the surrounding countertops on either side of the water center appliance when installed. In some examples, the water center appliance 100 can be installed such that the top of the appliance 100 is flush with the top of the adjacent countertops. Alternatively, the water center appliance can be installed similar to an under mount sink (e.g., as in FIG. 2), wherein the adjacent countertops extend over the top of the appliance 100. The type of installation can depend on the type of sink basin used (e.g., top mount or under mount), as well as the dimensions of the sink basin and water center appliance generally. For example, where the sink basin extends across the entire width of the appliance 100 (as in FIG. 2), the appliance 100 may be installed in an under mount manner with the adjacent countertops extending over the appliance 100. It should be appreciated that the example embodiments of the water center appliance illustrated herein include a single basin sink, however these illustrations are not intended to be limiting. The water center appliance may include any of the various sink basins known in the art including a dual basin.

In some examples, the water center appliance 100 may include one or more anti tip or anchoring mechanisms (not shown) that enable the water center appliance 100 to be anchored to the wall, so as to prevent the appliance 100 from tipping over when a force is exerted.

In some examples, the water center appliance 100 may include appropriate apertures and spacing for a variety of utility connections. For example, the appliance 100 may have a water inlet configured to connect to a standard wall water connection. Additionally, the appliance 100 may have a power connection, which can be connected to a standard wall outlet to provide power to the water center appliance 100. The water center appliance 100 can also include wiring, circuitry, in cabinet lighting and safety mechanisms (e.g., fuses) to enable the various functions such as the display, water filtration, disposal operation, and more, described in further detail below.

The water center appliance may also include various output connections, such as an output for the drain and/or disposal, and connections for a dishwasher. The water center appliance 100 can include all the connections typically included in and around the sink in an ordinary kitchen, laundry room, or other suitable space.

Figure 3A:
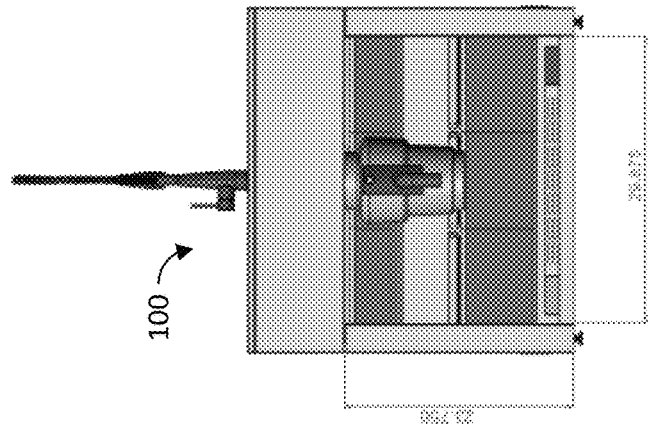
FIGS. 3A-D illustrate top, front, side, and rear views of the example water center appliance of FIG. 1, according to embodiments of the present disclosure.
Figure 3C:
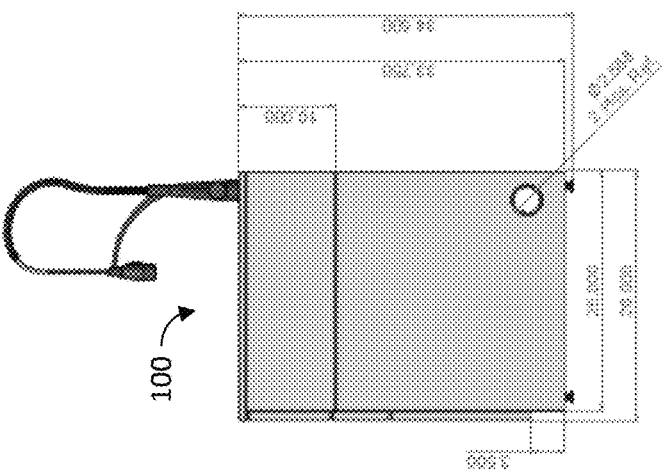
Figure 3B:
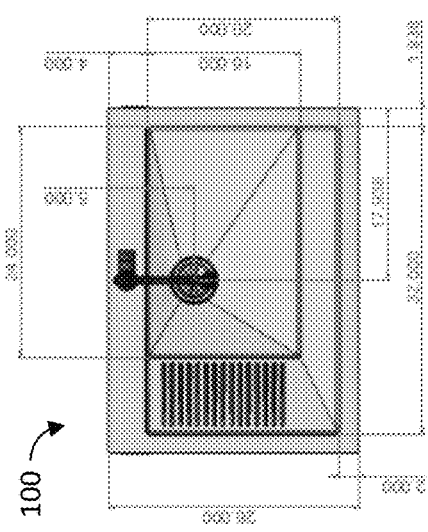
Figure 3D:
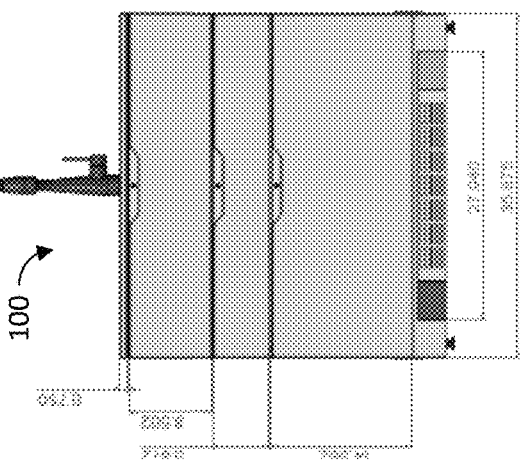

FIGS. 3A-D illustrate, respectively, top, front, side, and rear perspective views of the example water center appliance 100, according to one embodiment. FIGS. 3A-3D provide one possible set of dimensions associated with the water center appliance 100. In this example embodiment, the water center appliance has a width of 35.875 inches, a depth of 26 inches, and a height of 34.5 inches (including the leveling feet). The sink basin positioned on the top of the appliance 100 has a width of 32 inches and a depth of 20 inches, leaving a perimeter in the top of the appliance 100 around the sink as shown in FIG. 3A. It should be appreciated, however, that these dimensions are exemplary for this specific embodiment. It should be appreciated that many other dimensions can be used while remaining within the scope of this disclosure, and that the specific dimensions should not be understood as limiting.

Figure 4:
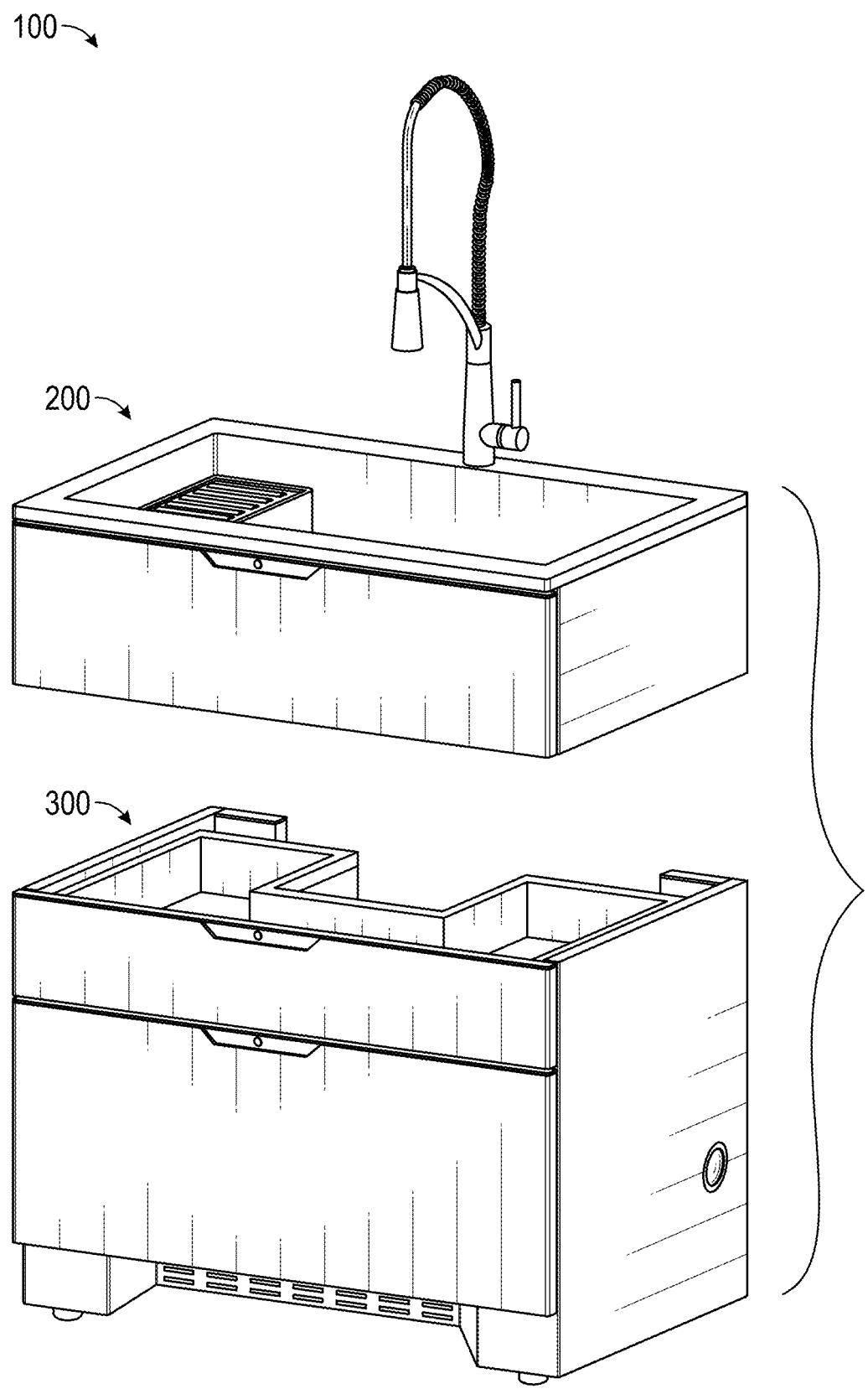
FIG. 4 illustrates an exploded front perspective view showing a top section and a bottom section of the example water center appliance of FIG. 1, according to embodiments of the present disclosure.
Figure 5:
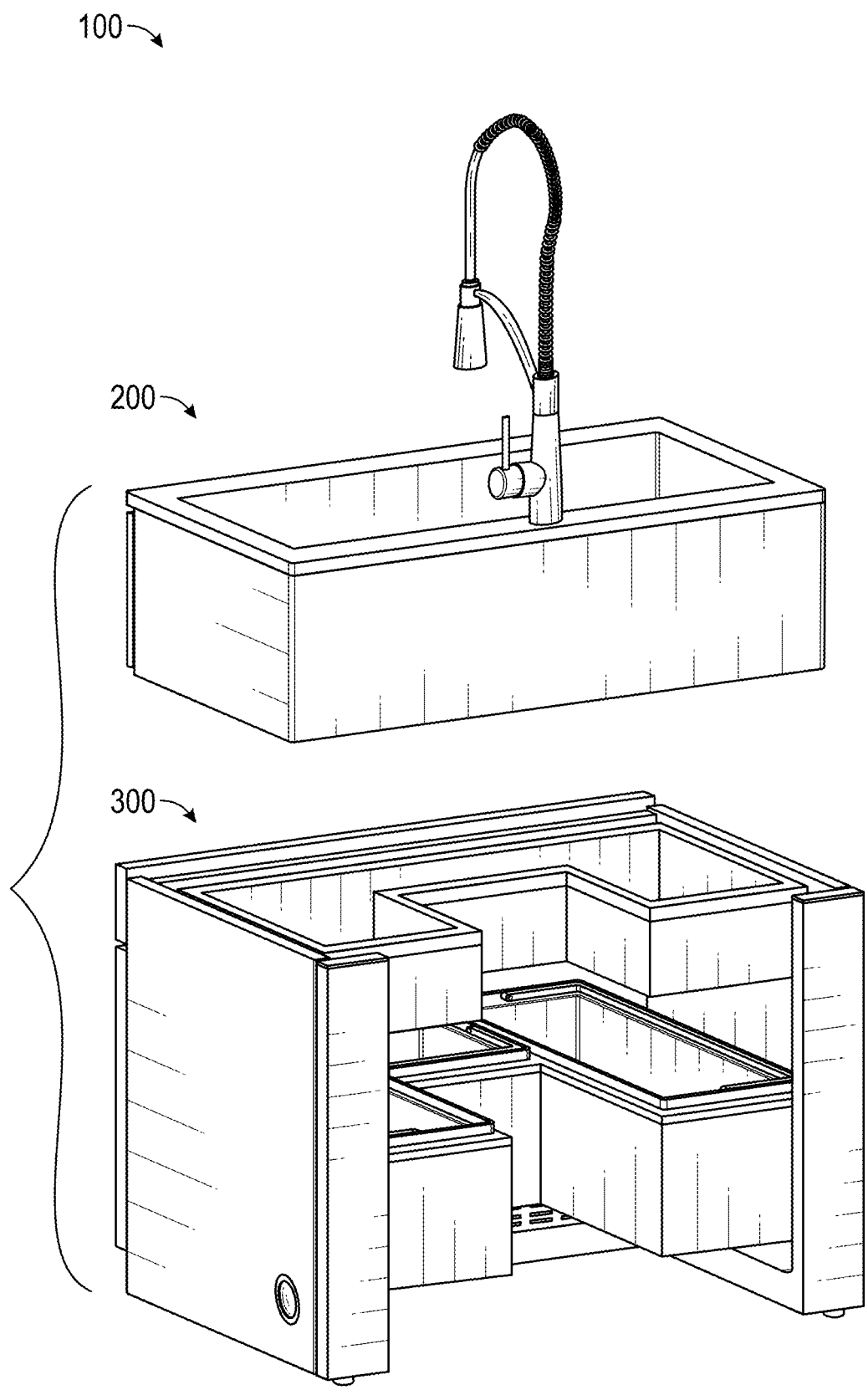
FIG. 5 illustrates an exploded rear perspective view showing the top section and the bottom section of the example water center appliance of FIG. 1, according to embodiments of the present disclosure.

FIGS. 4 and 5 illustrate exploded front and rear perspective views of the water center appliance 100. As shown in the figures, the water center appliance 100 can include a top section 200 and a bottom section 300. The bottom section 300 can be further separated into multiple sections. For example as illustrated in FIGS. 4 and 5, the bottom section 300 may include two separate drawers as described in greater detail below. The top section 200 can be installed independently from the bottom section 300. In some examples, the top section can be installed in the same footprint as an existing sink, and can include all the utility connections, wiring, fuses, and other mechanisms used in connection with the water filter, faucet, and more, as disclosed below.

As illustrated in the rear view of the water center appliance in FIG. 5, the bottom section may be specifically designed with clearance to accommodate the plumbing and connection equipment. It should be appreciated that FIG. 5 illustrates an example embodiment, and that the clearance sections of the water center appliance may be sized appropriately for any installation.

Figure 6:
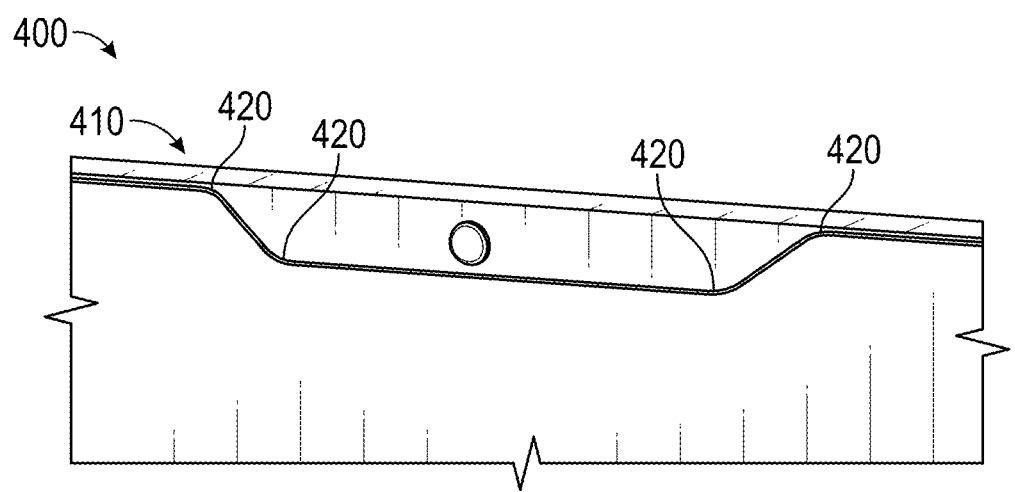
FIG. 6 illustrates a front perspective view of an example handle and trim of a door of the example water center appliance of FIG. 1, according to embodiments of the present disclosure.

FIG. 6 illustrates an example handle 400 and trim that can be used for the front hinged door of the top section 200, the first sliding drawer of the bottom section 300, and/or the second sliding drawer of the bottom section 300. It should be appreciated that the handle 400 is one example handle, and that many other handles can be used as well.

In the illustrated example, the handle 400 includes a 45 degree chamfer on the top edge The handle 400 also includes a recessed area having light radius curvatures 420, such that a trapezoidal inset shape is formed, as shown in FIG. 6. In one example embodiment, the handle can be depressed to unlatch and open the drawer. The handle 400 can have any finish, including chrome, black chrome, copper, stainless steel, and more. It should be appreciated that in other example embodiments, the handle may include a different shape, size and/or look.

FIGS. 7-11 illustrate various features that may be included in the top section 200. For example, the top section 200 may include a front hinged door 210, a water filter assembly 220, a display 230, and a storage area 240. The top section 200 may also include plumbing and connections for water, drainage, and electricity.

Figure 7:
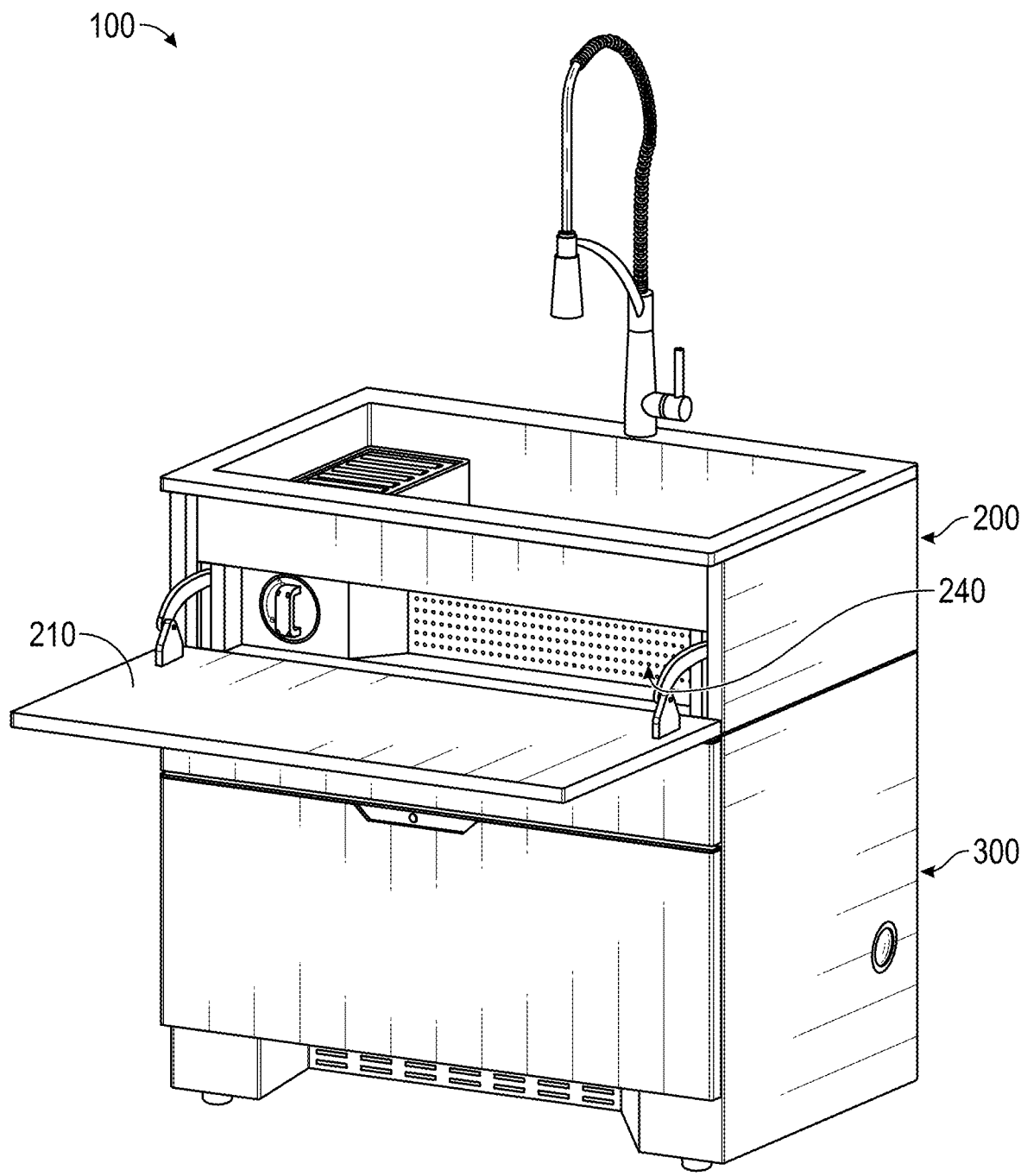
FIG. 7 illustrates a front perspective view of the example water center appliance of FIG. 1, wherein the front hinged door of the top section is opened, according to embodiments of the present disclosure.

FIG. 7 illustrates the water center appliance 100, wherein the front hinged door 210 of the top section 200 is in the open position. The front hinged door 210 is rectangular in shape, and is connected to the top section 200 via two hinges 212A and 212B positioned on opposite sides of the door 210. The hinges 212A and 212B enable the door to open as shown in FIG. 7, similar to the tailgate of a truck. The front hinged door 210 may include one or more mechanisms that enable the door to be opened or closed, such as a magnetic coupling or mechanical coupling. The front hinged door 210 may also include a "soft close" mechanism that enables the door 210 to be pushed closed quickly, with the final moments of closure being slowed down so as to prevent the door from slamming shut.

In some examples, the color, material, handle, and/or finish of the front hinged door 210 may be interchangeable. As such, the specific details shown in the Figures are for example only, and should not be read as limiting.

Figure 8:
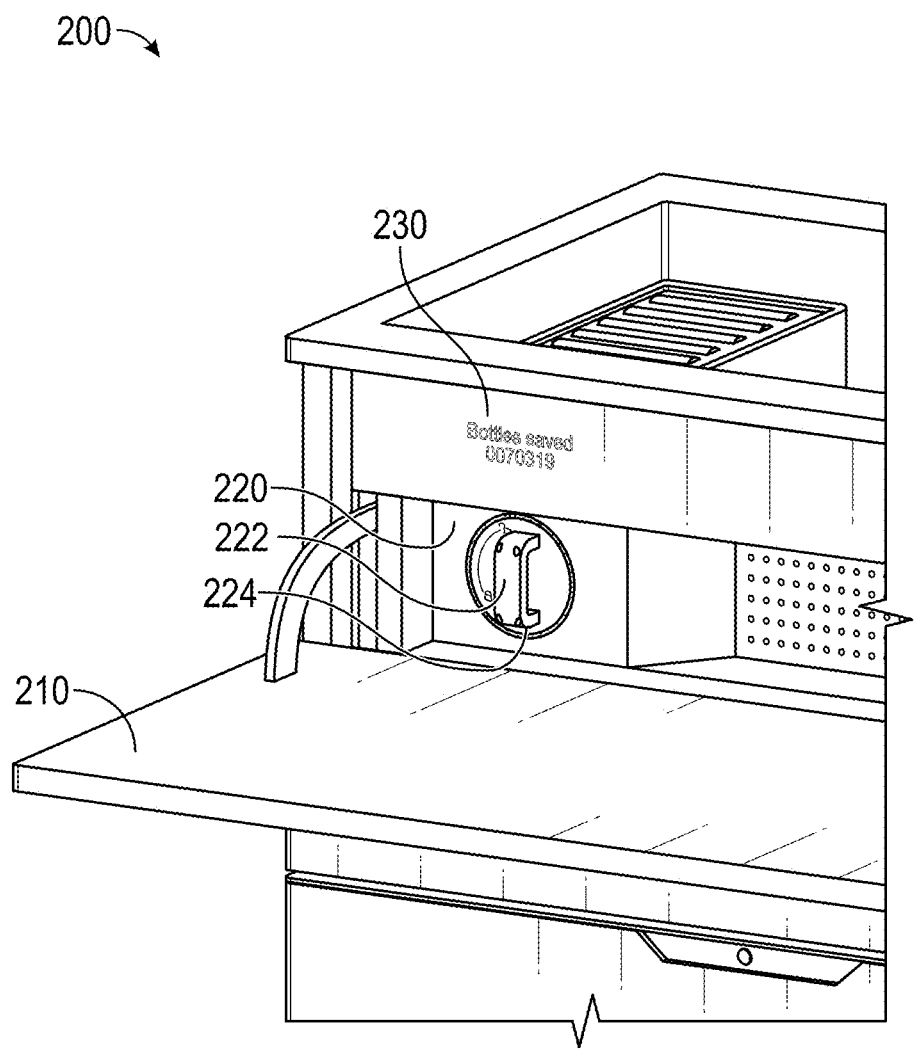
FIGS. 8-10 illustrate close-up views of the water filter in an installed state and an uninstalled state, according to embodiments of the present disclosure.
Figure 9:
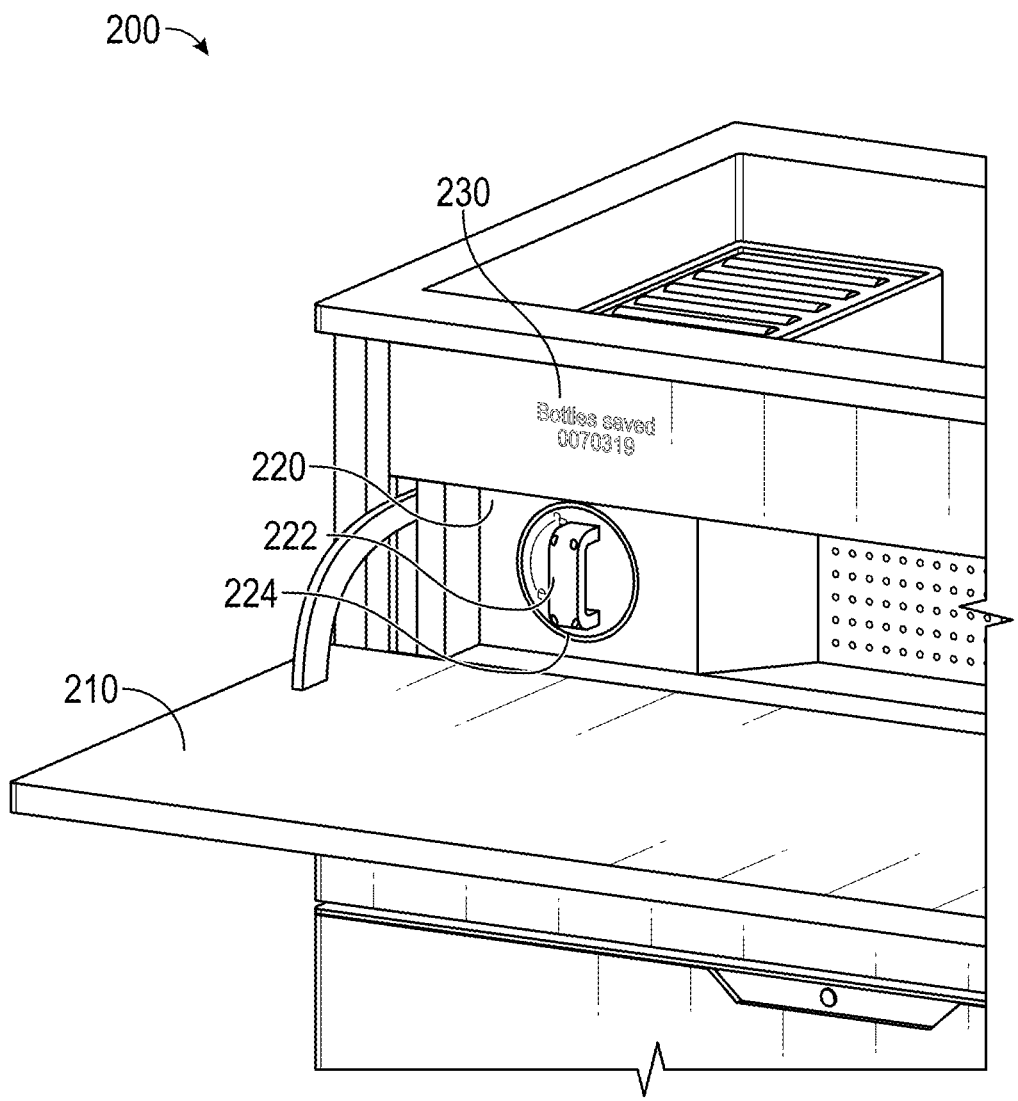
Figure 10:
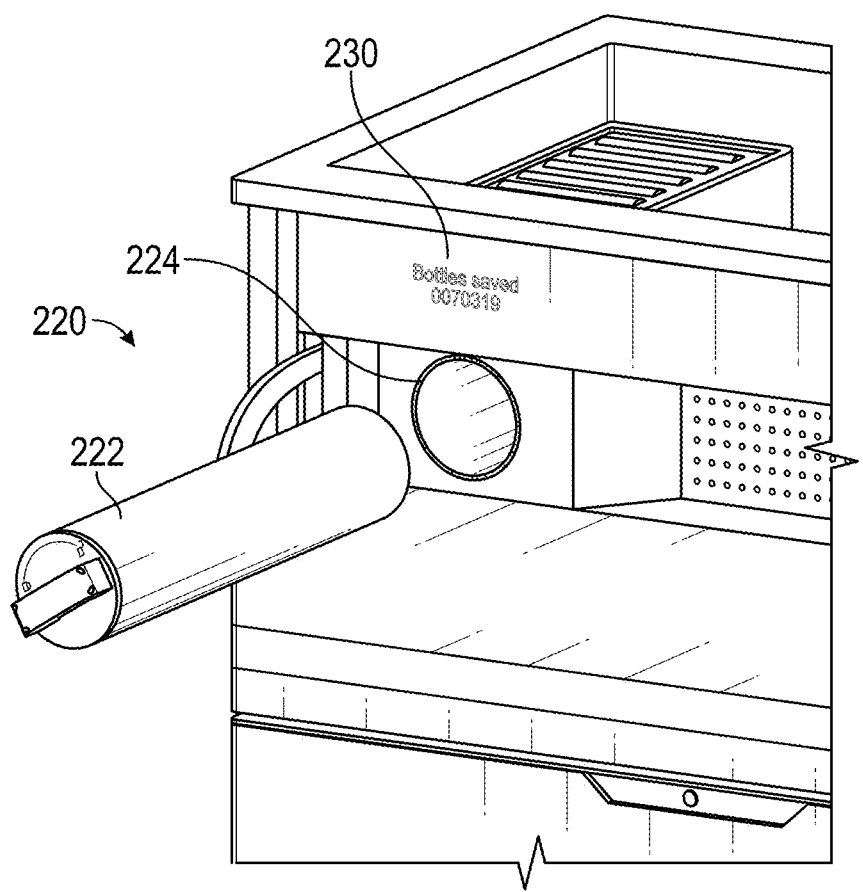
Figure 11:
FIG. 11 illustrates an example user interface of the example water center appliance of FIG. 1, according to embodiments of the present disclosure.
Figure 12:
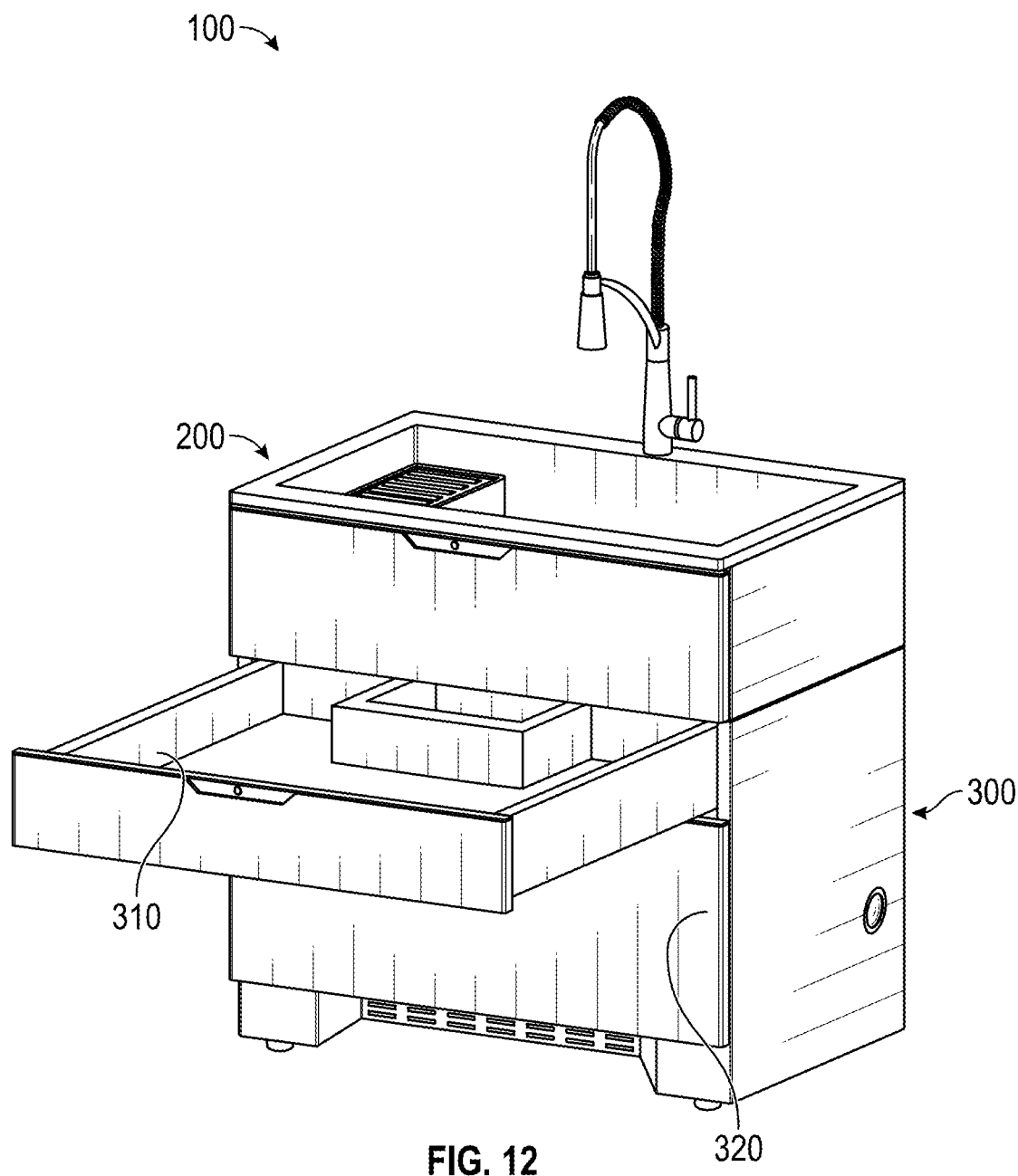
FIGS. 12-13 illustrate front perspective views showing the example water center appliance of FIG. 1 with a first sliding drawer opened, according to embodiments of the present disclosure.
Figure 13:
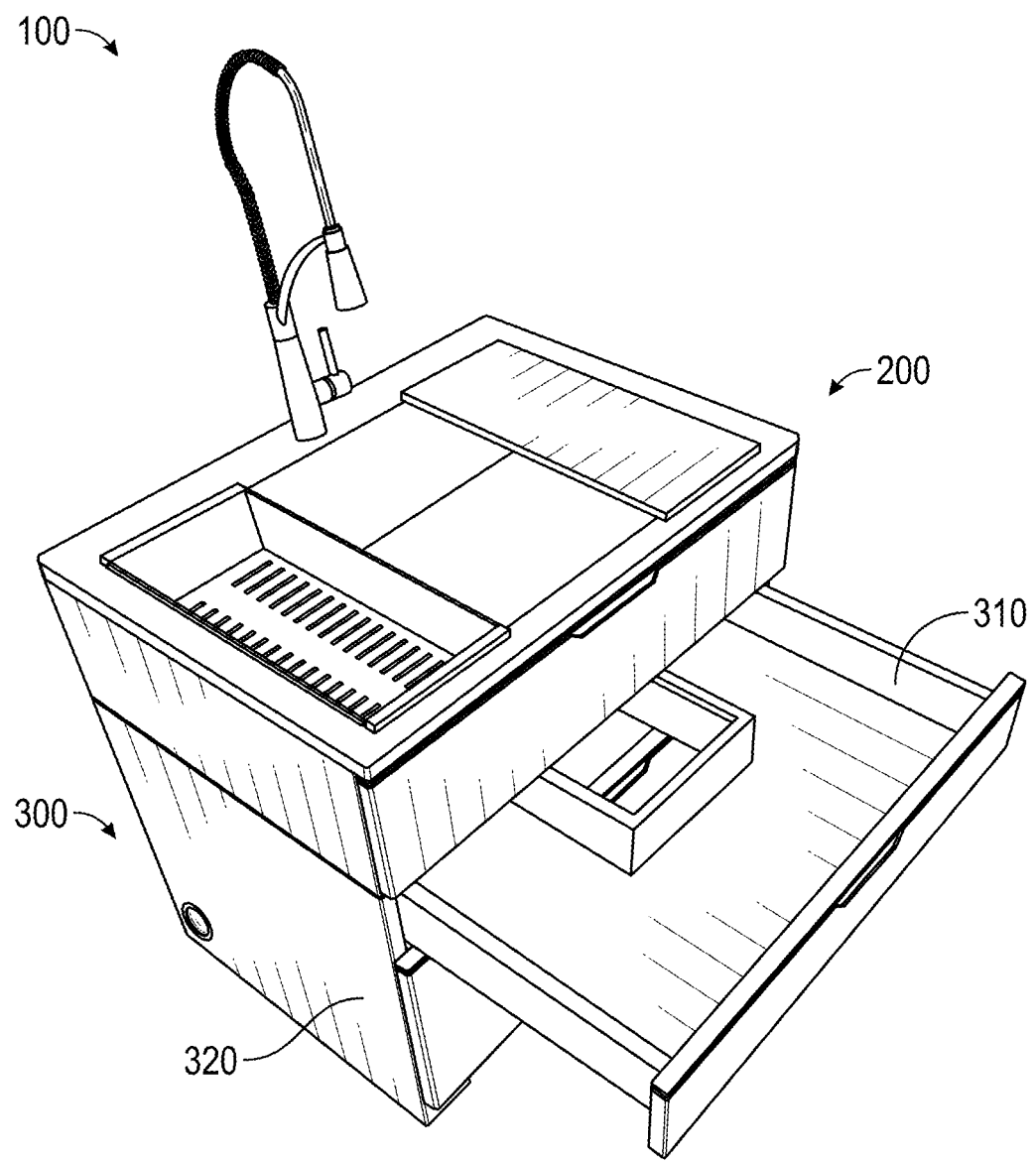

The water center appliance 100 may further include a water filter assembly, which is illustrated on the left side of the image in FIG. 7. As illustrated in the example embodiment of FIG. 7, the sink basin has a raised ledge portion on the left side of the sink to accommodate a water filter assembly 220 below. FIGS. 8, 9, and 10 illustrate a water filter assembly 220 positioned in the top section 200. In this example embodiment, the water filter assembly 220 is positioned in the front left of the top section 200, behind the front hinged door 210, for ease of access to a user. It should be appreciated that the water filter assembly 220 may be positioned on the right side of the water center appliance or in any other position on the water center appliance 100.

In the illustrated example, the water filter 222 is a cylindrical filter that is inserted into an opening of the top section 200. The opening is shown best in FIG. 10. It should be appreciated that in alternative embodiments, the water filter 222 may be a different size and/or shape. The water filter assembly 220 further includes a filter status display 224 that provides status indications for the water filter assembly. In the example embodiment illustrated in FIGS. 8-10, filter status display 224 is a circular illuminated display 224 which surrounds the opening for the water filter 222. In this example, the circular illuminated display 224 may be configured to display a different color, pattern, or sequence depending on a status of the water filter 22. For example, the circular illuminated display may be red to indicate that the filter should be replaced, white to indicate that the filter is not working, not plugged in correctly, or missing, and blue to indicate that the filter is working properly. In some examples, another color scheme may be used, and/or another method of indicating the health status, such as blinking or flashing. Further, other information can be indicated as well, such as a remaining life of the water filter shown by a partial circle being displayed.

It should be appreciated that in certain alternative embodiments the filter status display 224 may include a different shape and/or may be located in a different position on the water center appliance. For example, in certain embodiments, the filter status display may include a simple LED display that communicates status of the water filter either through different colored lights. In another example embodiment, the filter status display may be a digital display or any other suitable display. It should be appreciated that as indicated above with respect to the circular illuminated display, in some examples, another color scheme may be used, and/or another method of indicating the health status, such as blinking or flashing. Further, any of the filter status displays described herein may indicate other information as well, such as a remaining life of the water filter shown by a partial circle being displayed. Other variations are possible as well.

The water center appliance 100 may also include a secondary display 230, positioned near the water filter assembly 220. In the illustrated example, the display 230 is approximately one inch by one inch square LCD screen, however it should be appreciated that this display may be of any suitable shape and/or size. The secondary display 230 may provide information to a user, such as the number of bottles saved by using the filter, the gallons or liters filtered, the water usage in the last 24 hours, the average usage per day, and more. The secondary display 230 is shown as being positioned on the left side of the water center appliance 100, adjacent to the water filter assembly 220, however it should be appreciated that the display 230 may be positioned in another location.

The top section 200 of the water center appliance 100 also includes a storage area 240 as illustrated in FIG. 7. In one example embodiments, the storage area 240 may be positioned adjacent to the water filter assembly 220. In one example embodiment, the storage area 240 may include a grated wall, such that air can enter and exit the storage area.

In some examples, the top section 200 also includes various utility connections for water and electricity (as noted above). This enables the top section 200 to stand alone and be installed without the bottom section 300.

The top section 200 also includes connections for a faucet, such as the faucet 500 illustrated in the Figures, and described in further detail below.

FIGS. 12-18 illustrate various views of the bottom section 300 of the water center appliance 100. The bottom section 300 can be paired with and attached to the top section 200, to create a single unit, or can be detached from the top section 200 and installed separately.

In the illustrated embodiment, the bottom section 300 includes a first sliding drawer 310 and a second sliding drawer 320. Each sliding drawer is shaped to accommodate various internal components of the water center appliance 100, such as the plumbing, the drain, a disposal, and more. For example, as shown best in FIGS. 12, 13, 16, and 17, the first and second sliding drawers 310 and 320 are "U" shaped, such that there is a middle section cut out. The middle sections are positioned such that the drain and disposal can extend downward without running into the drawers. It should be appreciated that the shaped of the first drawer 310 and the second drawer 320 can be modified based on the positioning of the drain, disposal, and other components of the water center appliance 100. For example, if the drain is position on the right side of the sink, the drawers can correspondingly be designed such that the opening is positioned on the right side as well, and such that the drawers are not symmetric.

In some examples, the first drawer 310 and the second drawer 320 can have different heights, enabling them to accommodate and store different products (e.g., cleaning supplies). In the illustrated embodiment, the first sliding drawer 310 is shorter than the second sliding drawer 320. However in other examples, the second sliding drawer may be shorter than the first sliding drawer, or the sliding drawers may have the same height.

In some examples, the depth of the first sliding drawer 310 and the second sliding drawer 320 may be the same, or may be different. The depth may be designed so as to accommodate plumbing or other components of the water center appliance 100. For example, the first and second drawers may be designed with a depth such that when the drawers are closed, there is a several inch gap (e.g., four inches) at the back, inside the water center appliance 100.

In some examples, the front panels of the first sliding drawer 310 and the second sliding drawer 320 can be interchangeable or removable. Further, each sliding drawer can have the same handle and/or trim as discussed above, or may have a different handle and trim. Each sliding drawer may include various mechanisms to enable opening and closing of the sliding drawers, such as a soft close mechanism.

Figure 14:
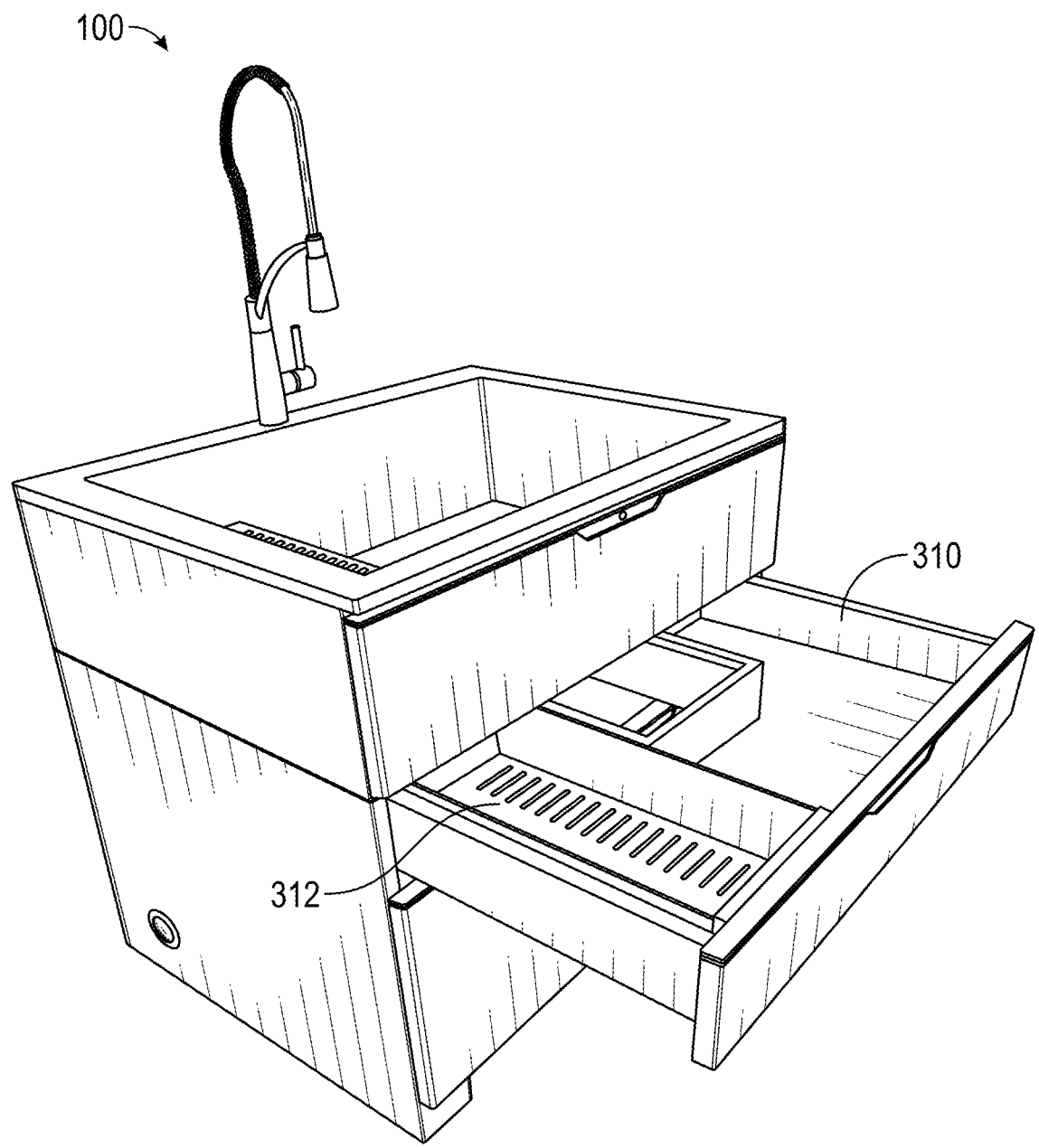
FIGS. 14-15 illustrate front perspective views showing the example water center appliance of FIG. 1 with a first sliding drawer opened and including accessories, according to embodiments of the present disclosure.
Figure 15:
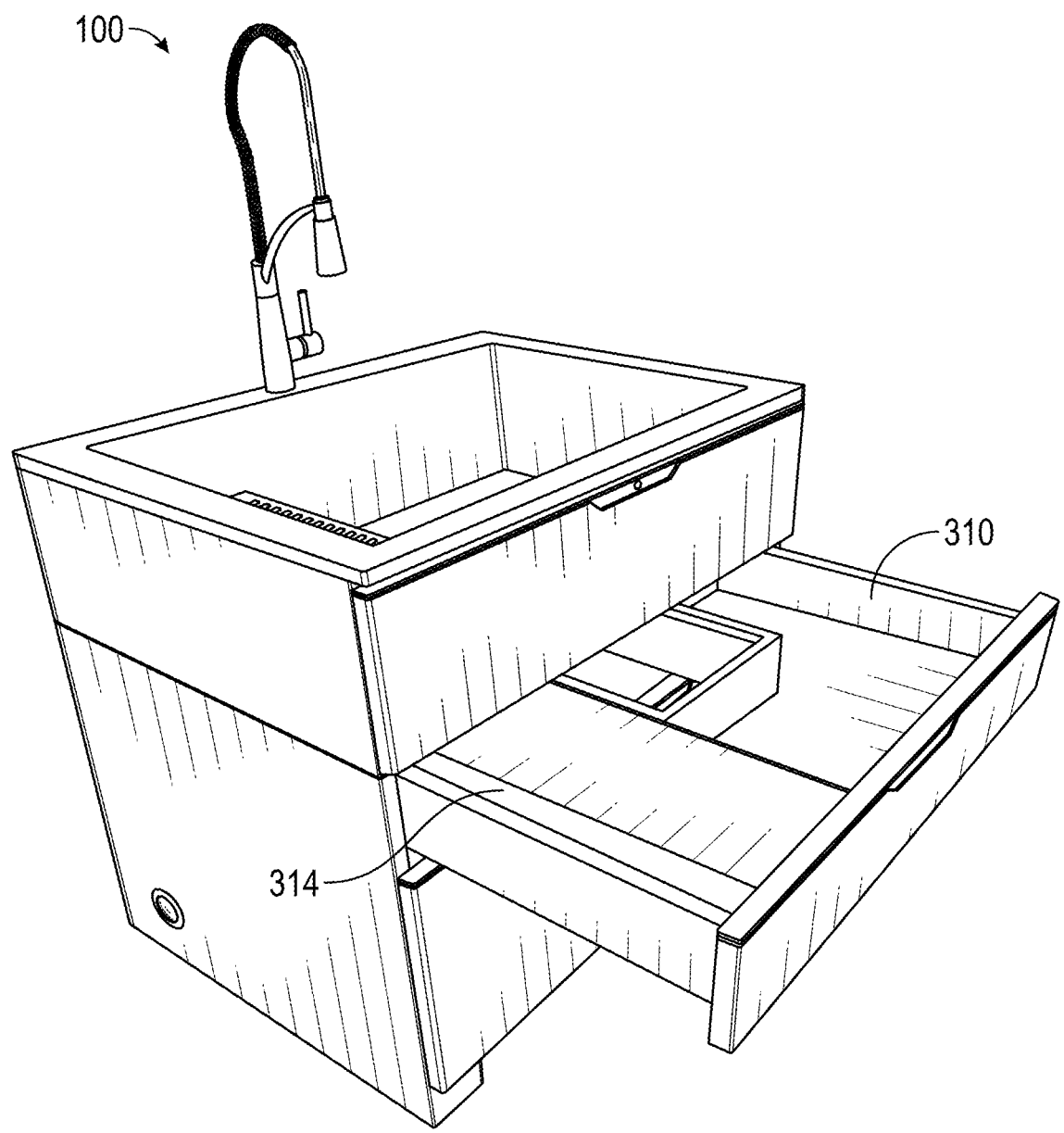
Figure 16:
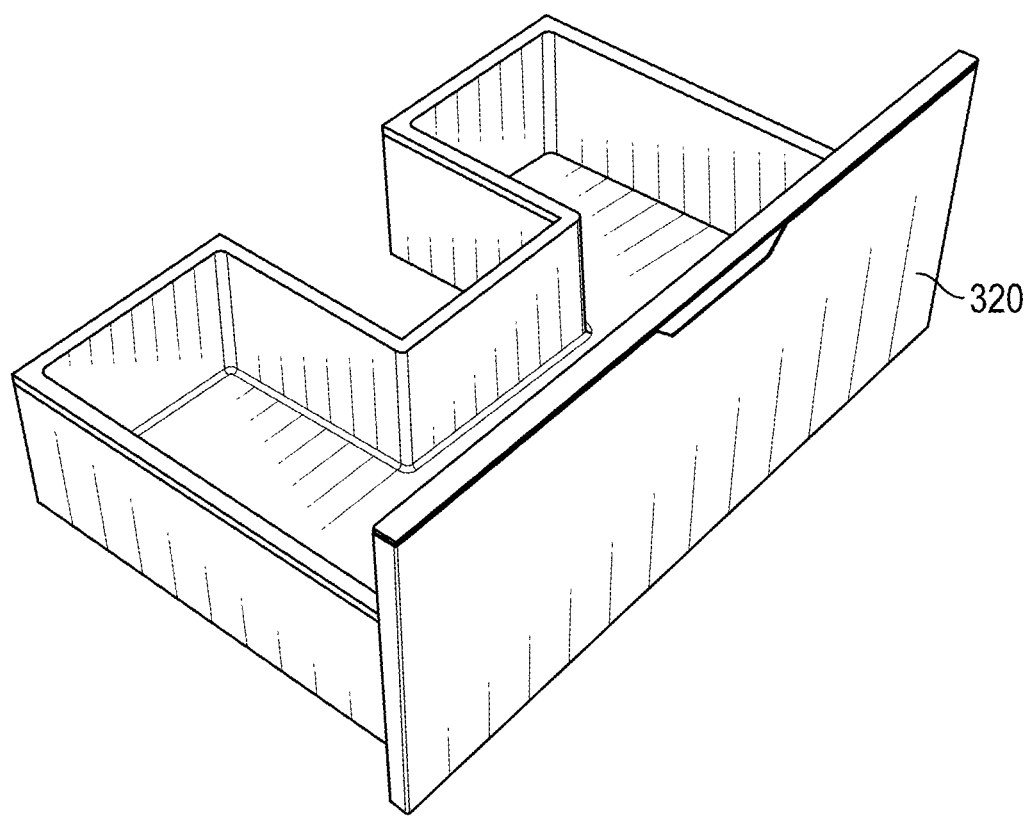
FIGS. 16-17 illustrate front and rear perspective views showing a second sliding drawer of the example water center appliance of FIG. 1, according to embodiments of the present disclosure.

FIGS. 14 and 15 illustrate various accessories that can be positioned in the first sliding drawer 310. As shown in FIG. 14, a colander 312 can be inserted into one of the legs of the first sliding drawer 310. The colander can also be inserted into the sink. FIG. 15 illustrates a cutting board 314 that can be inserted on top of the colander 312 and stored in the first sliding drawer 310. It should be appreciated that any variety of other accessories can be included in addition or instead.

Figure 17:
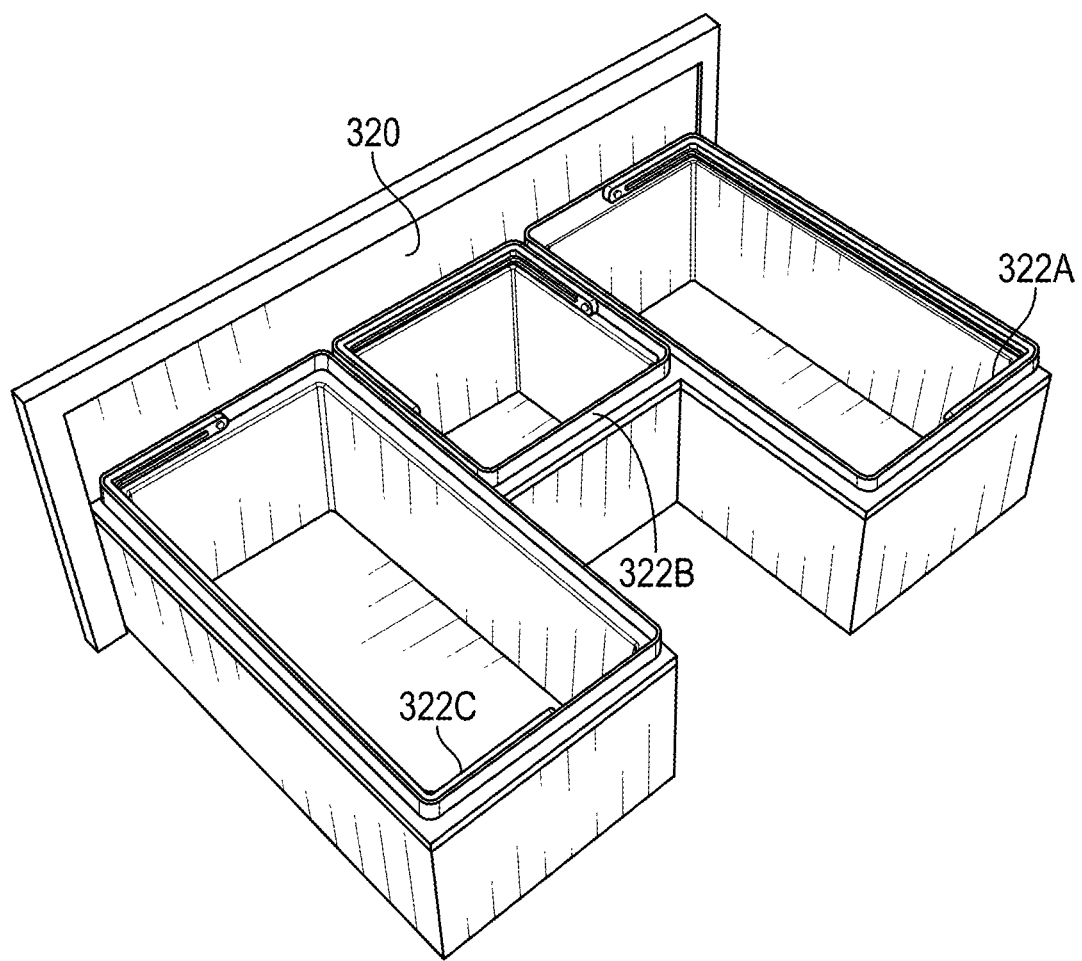
Figure 18:
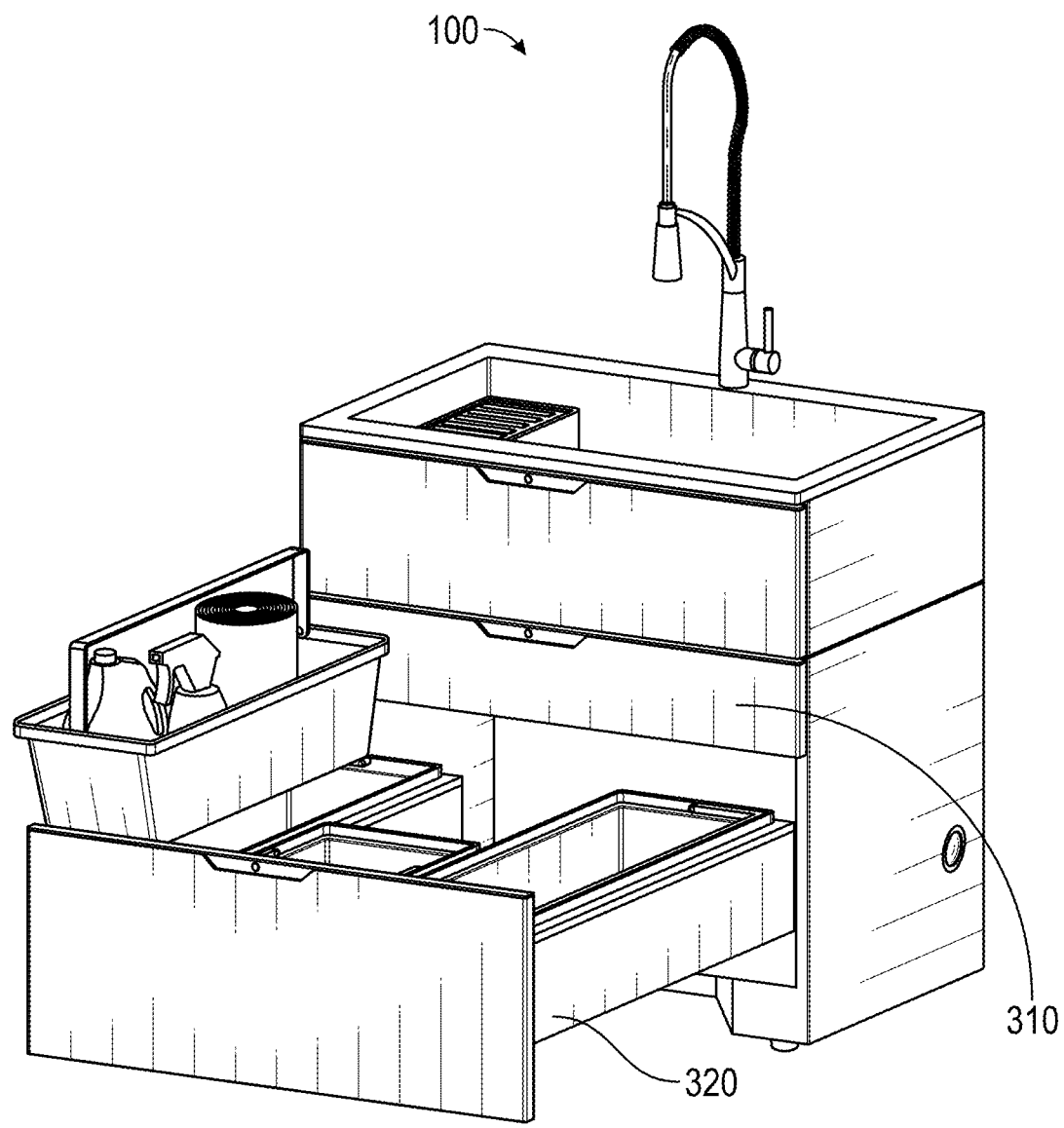
FIG. 18 illustrates a front perspective view showing the example water center appliance of FIG. 1 with a second sliding drawer opened and including accessories, according to embodiments of the present disclosure.

FIG. 17 illustrates the second sliding drawer 320 including a plurality of organizational compartments 322A-C that can be included. The organizational compartments 322A-C may fit into the legs of the second sliding drawer 320, and may be configured to organize and store various products, such as cleaning supplies, as shown in FIG. 18. It should be appreciated that the size, shape, orientation, and position of each of the organizational compartments may vary for each embodiment.

Figure 19:
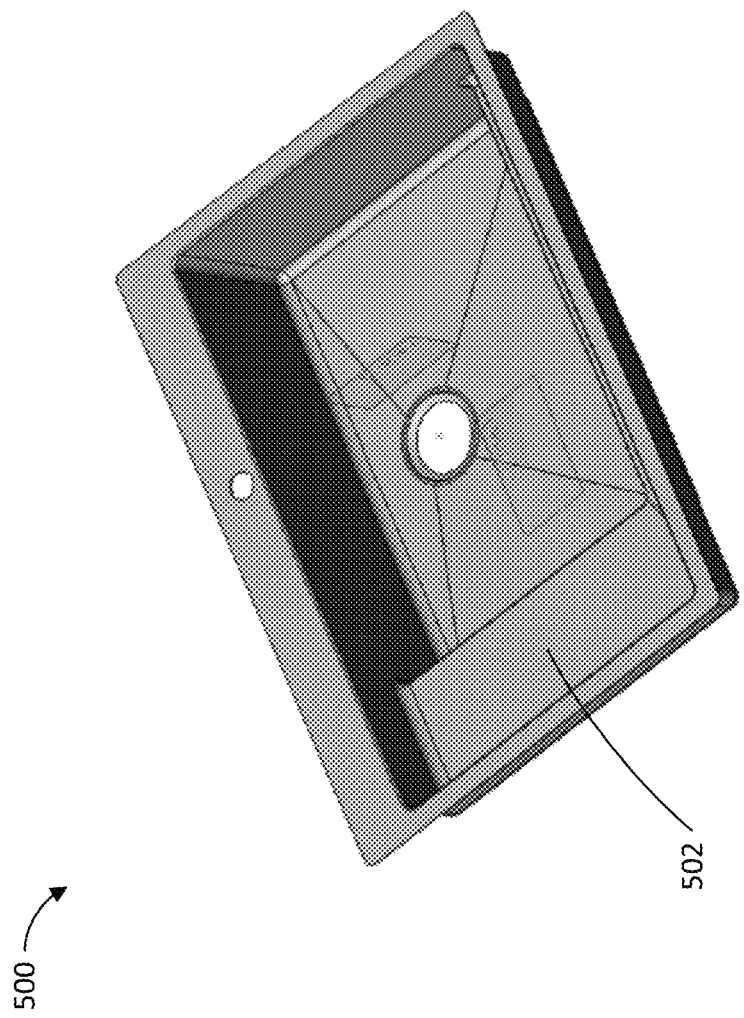
FIGS. 19-21 illustrate example sink basins that can be used with the example water center appliance of FIG. 1, according to embodiments of the present disclosure.
Figure 20:
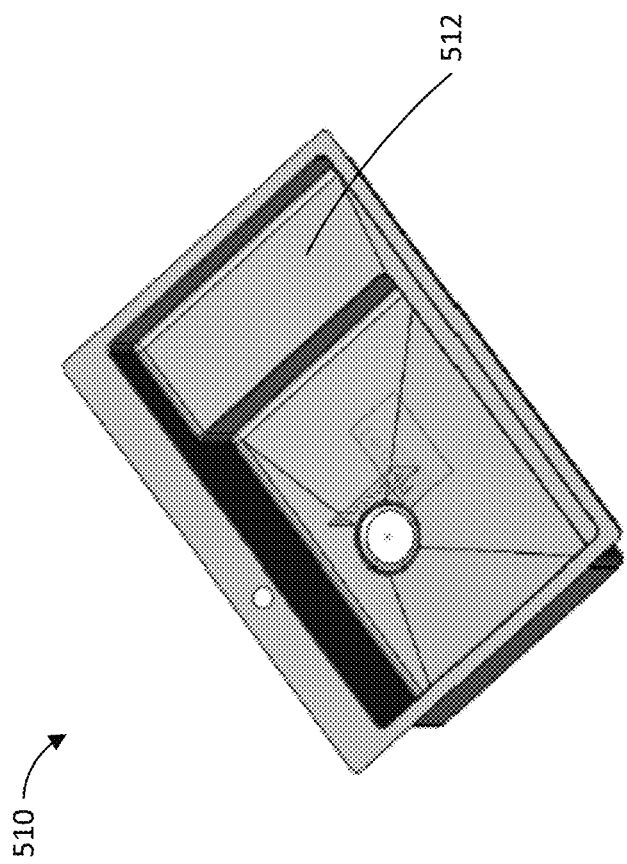
Figure 21:
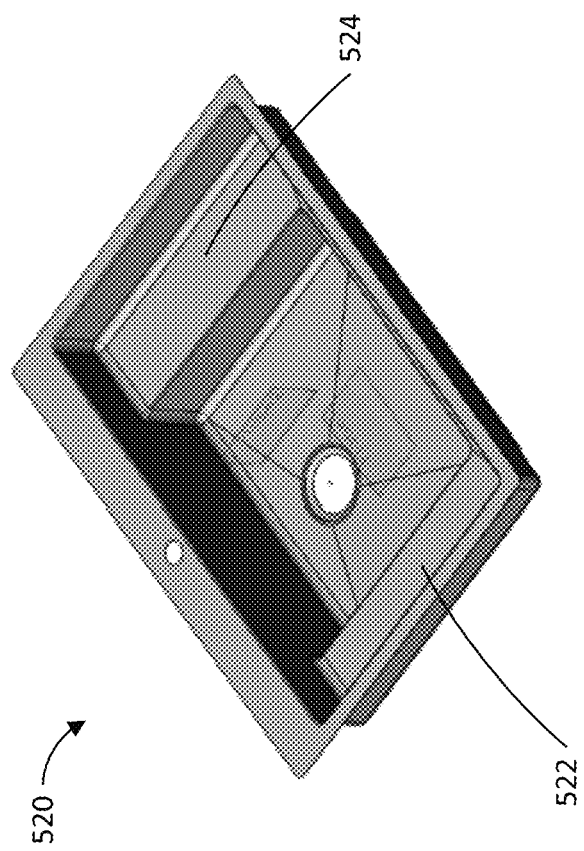
Figure 22:
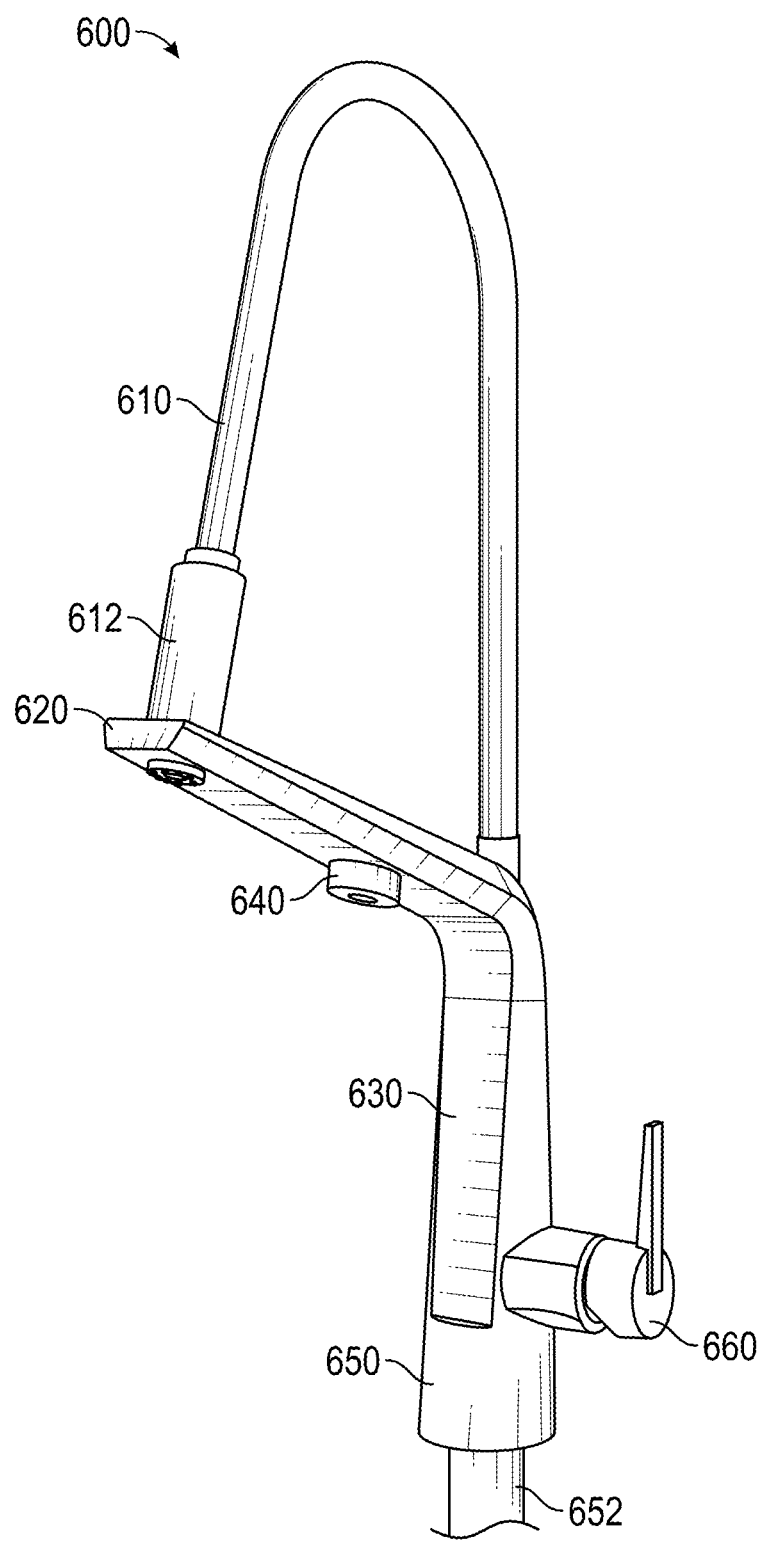
FIG. 22 illustrates an example multipurpose faucet that can be used with the example water center appliance of FIG. 1, according to embodiments of the present disclosure.

FIGS. 19, 20, and 21 illustrate example sink basins that can be used in connection with the water center appliance 100. While specific examples are shown in FIGS. 19, 20, and 21, it should be appreciated that many other sink designs can be used instead. For example, each of FIGS. 19-21 illustrate a single sink basin, but it should be appreciated that any of these sink basins may be replaced with a dual sink basin. It should further be appreciated that the dimensions of each of the illustrated sink basins are merely illustrative, and are not intended to be limiting. In certain alternative embodiments, the sink basins may have a different set of dimensions.

FIG. 19 illustrates a first sink basin 500 that can be used. The sink basin 500 includes a ledge 502 positioned on a left side, extending from the front to the back of the basin. The ledge 502 is raised from the bottom of the basin. As described above with respect to FIG. 7, the ledge 502 is positioned at a specific height to enable the water filter assembly 220 (shown in FIGS. 8-11) to fit in the top section 200 on the left side (when viewed from the front). The use of a larger filter may correspond to a shallower ledge, or a ledge that is positioned higher toward the top of the sink. The upper surface of the ledge may include ridges or grooves (not shown) to assist with water movement and/or retaining objects thereon. It should be appreciated that the upper surface of the ledge may accommodate any variety or surfaces.

FIGS. 30A-G illustrate front, back, left, right, top, bottom, and perspective views of an example sink basin that includes a left ledge and that may be used in connection with the water center appliance(s) disclosed herein.

FIG. 20 illustrates a second example sink basin 510 that can also be used. The second example sink basin 510 may be similar to the first sink basin 500, but with a ledge 512 positioned on the right side rather than the left side. In certain embodiments that include a water filter assembly 220, the ledge 512 is positioned at a specific height to enable a water filter assembly to fit in the top section 200 on the right side (when viewed from the front). The use of a larger filter may correspond to a shallower ledge, or a ledge that is positioned higher toward the top of the sink. It should be appreciated that in certain embodiments that do not include a water filter assembly, the ledge may still be utilized for aesthetic purposes or for other utility related to the sink.

FIGS. 32A-G illustrate front, back, left, right, top, bottom, and perspective views of an example sink basin that includes a right ledge and that may be used in connection with the water center appliance(s) disclosed herein.

FIG. 21 illustrates a third example sink basin 520 that can be used. The third example sink basin 520 may be similar to both the first sink basin 500 and the second sink basin 510, but with ledges 522 and 524 positioned respectively on the left side and right side. Either or both of the ledges 522 and 524 can be positioned at specific heights to enable a water filter assembly to fit in the top section 200 on the left side, the right side, or both sides (e.g., where there are two filters).

FIGS. 35A-G illustrate front, back, left, right, top, bottom, and perspective views of an example sink basin that includes both a right and left ledge. This is another example of a sink basin that may be used in connection with the water center appliance(s) disclosed herein.

It should also be appreciated that the sink basin may include a ledge on the front side (or the rear side) as well. For example, FIGS. 34A-G illustrate front, back, left, right, top, bottom, and perspective views of an example sink basin that includes a front ledge. A front ledge can provide space underneath to accommodate the storage area 240. It should be appreciated that the size and shape of the front ledge may vary to accommodate different needs. For example, where only the top portion is installed, and the sink includes a front ledge, the sink may have a shorter front side, such that the sink may be ADA compliant and allow a person in a wheelchair to access the sink more easily than a sink without a front ledge.

It should further be appreciated that the water center appliance may include a sink basin with any combination of the ledged described herein, where the sizes of the each of the ledges may vary. For example, FIGS. 31A-G illustrate front, back, left, right, top, bottom, and perspective views of an example sink basin that includes both a left and a front ledge. Similarly, FIGS. 33A-G illustrate front, back, left, right, top, bottom, and perspective views of an example sink basin that includes both a right and front ledge. FIGS. 36A-G illustrate front, back, left, right, top, bottom, and perspective views of an example sink basin with all three ledges—left, right, and front ledges. Each of these example sink basins may be used in connection with the water center appliance(s) disclosed herein.

It should further be appreciated that each of the example sink basis above illustrate a single sink basin for illustrative purposes, but that these examples are not intended to be limiting. In certain alternative embodiments, the water center appliance may include any combination of ledges with a dual sink basin as well. For example, FIGS. 37A-G illustrate front, back, left, right, top, bottom, and perspective views of an example of a dual sink basin with a front ledge.

FIGS. 22 and 23A-E illustrate an example multipurpose faucet 600 that may be used separately or in connection with the water center appliance 100. The faucet 600 can have various finishes, shapes, and functions. In the illustrated example, the faucet 600 includes a flexible hose 610, a spot 620, a display 630, a continuous fill dispenser 640, a base 650, and a control lever 660.

In one embodiment, the flexible water hose 610 may be held in place by a mechanism on the spout. In the illustrated example, the flexible water hose 610 is held in place magnetically to the spout 620. The hose 610 includes a dual function sprayer 612 that enables it to switch between a standard water output and a spray output. The hose may be constructed of any of a variety of materials, including but not limited to braided steel or carbon fiber. The sprayer 612 extends through the spout 620 when it is attached, such that the end of the sprayer 612 extends partially below the bottom of the spout 620. This prevents water from dripping down the spout 620.

In one example embodiment, the faucet 600 also includes a display 630 which is configured to show a health status of the water filter (e.g., in a manner similar to the description above). The display 630 may also be configured to show a gallons or liters filtered, a daily water usage, and more.

In one embodiment, the faucet 600 also includes a continuous fill dispenser 640, which can be used to fill bottles, pots, and other containers. The faucet 600 may include one or more downward facing sensors configured to detect when a bottle or other container is positioned below the continuous fill dispenser 640, to automatically start and stop water output. Alternatively or additionally, the spout 620 may include a touch sensor (positioned on the top side of the spout 620 opposite the continuous fill sensor 640) that a user can activate to start and/or stop output from the continuous fill dispenser 640.

Figure 23C:
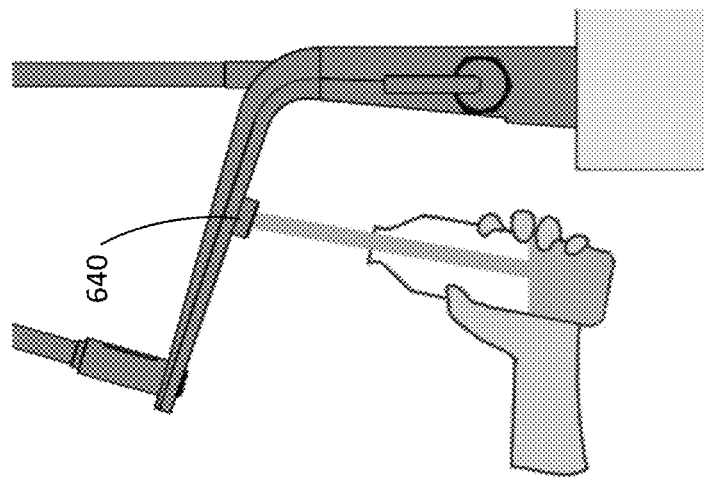
FIGS. 23A-C illustrate a series of side views of the multipurpose faucet of FIG. 22 filling a bottle.
Figure 23B:
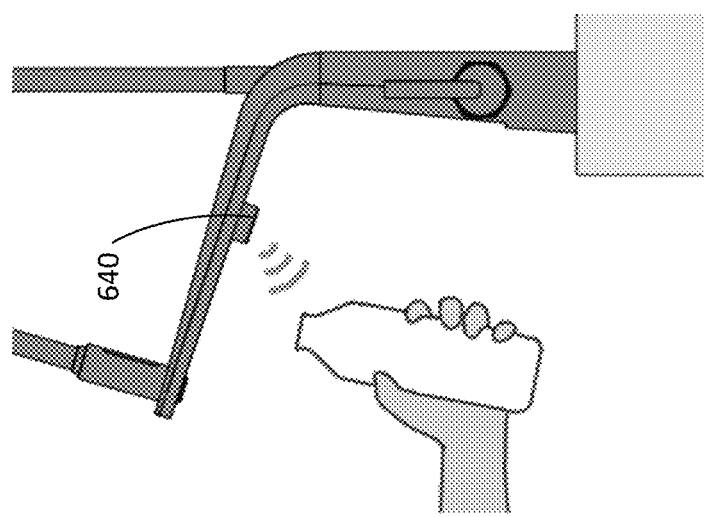
Figure 23A:
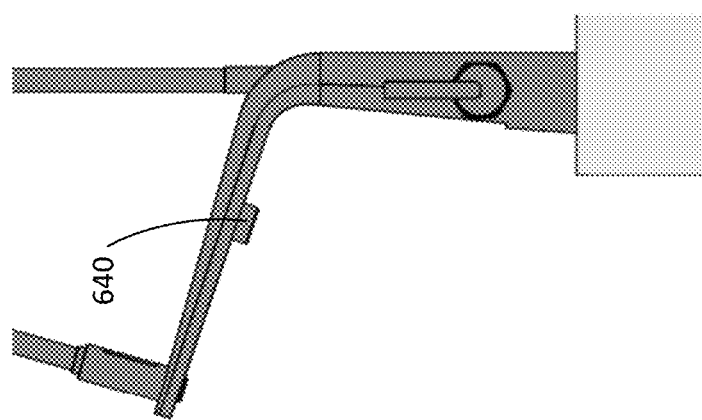

FIGS. 23A-C illustrate perspective side views of the faucet 600 during the process of filling a bottle using the continuous fill dispenser 640. In FIG. 23B, the sensor of the continuous fill dispenser 640 senses a bottle. After a small delay (e.g., two seconds), the continuous fill dispenser 640 begins filling the bottle with water. When the sensor detects that the bottle has been filled, moved, or some other event has occurred, the continuous fill dispenser 640 may stop the supply of water.

In one embodiment, the base 650 may be rotatably connected to the spout 620, such that the spout 620 is able to rotate about the base 650. In one embodiment, a magnetic or ball spring plunger may be used to center the spout 620 on the base 650, and to return the spout 620 to the center position after it is pivoted away from center. In certain embodiments, the faucet 600 may include a threaded stem 652 connected to the base, to enable the faucet 600 to be installed onto a sink or countertop.

In one embodiment, the control lever 660 includes several controls for the faucet 600. The lever is both rotatable and pivotable. For instance, the amount of water flow may be controlled by the angle between the extended arm and the base. The temperature may be controlled by the rotational position of the control lever 660.

In some examples, the faucet 600 also includes various electrical and mechanical connections to the water center appliance top section 200, so as to connect the faucet for power and to receive both filtered and unfiltered water.

Figure 23E:
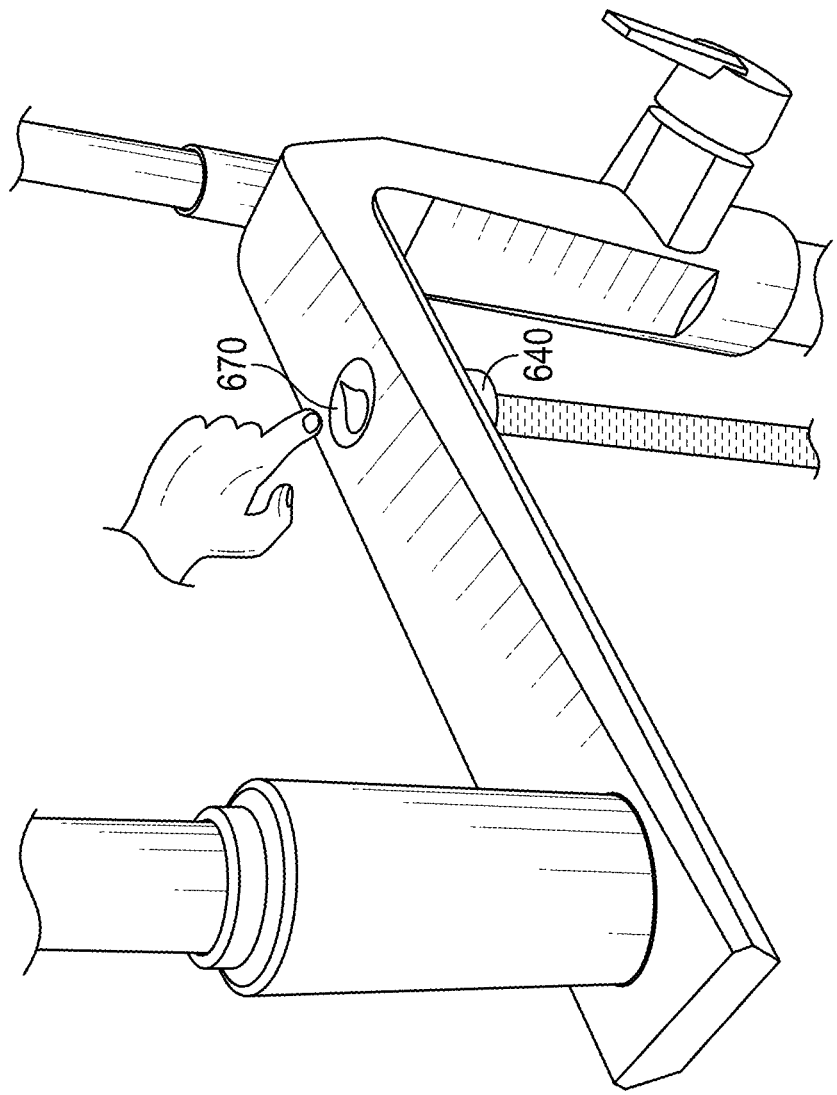
FIGS. 23D-E illustrate a side view and a perspective view respectively of the multipurpose faucet of FIG. 22 filling a large container.
Figure 23D:
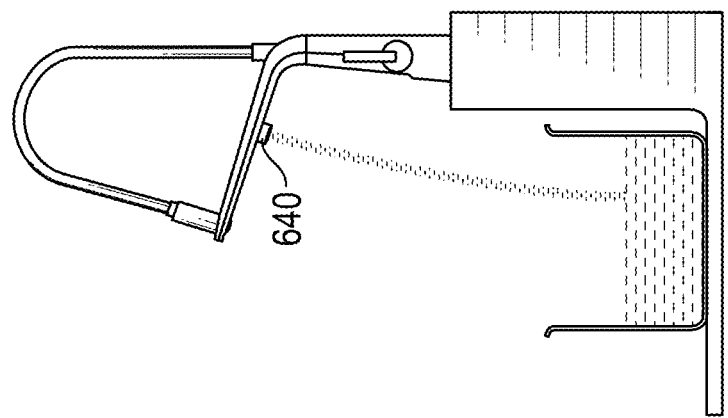

FIGS. 23D and 23E illustrate a side view and a perspective view of the continuous fill dispenser 640 of the faucet 600 during the process of filling a large container. The faucet 600 may include a touch sensor (e.g., a capacitive touch sensor) positioned on the top of the spout 620. A user may touch the touch sensor to start and/or stop the flow of water from the faucet.

FIGS. 24A-J illustrate an example embodiment wherein a water center appliance 1100 includes the faucet of FIGS. 23A-C. The water center appliance 1100 of FIGS. 24A-J may be similar or identical to the water center appliance 100 shown and described with respect to FIGS. 1-21.

Figure 24A:
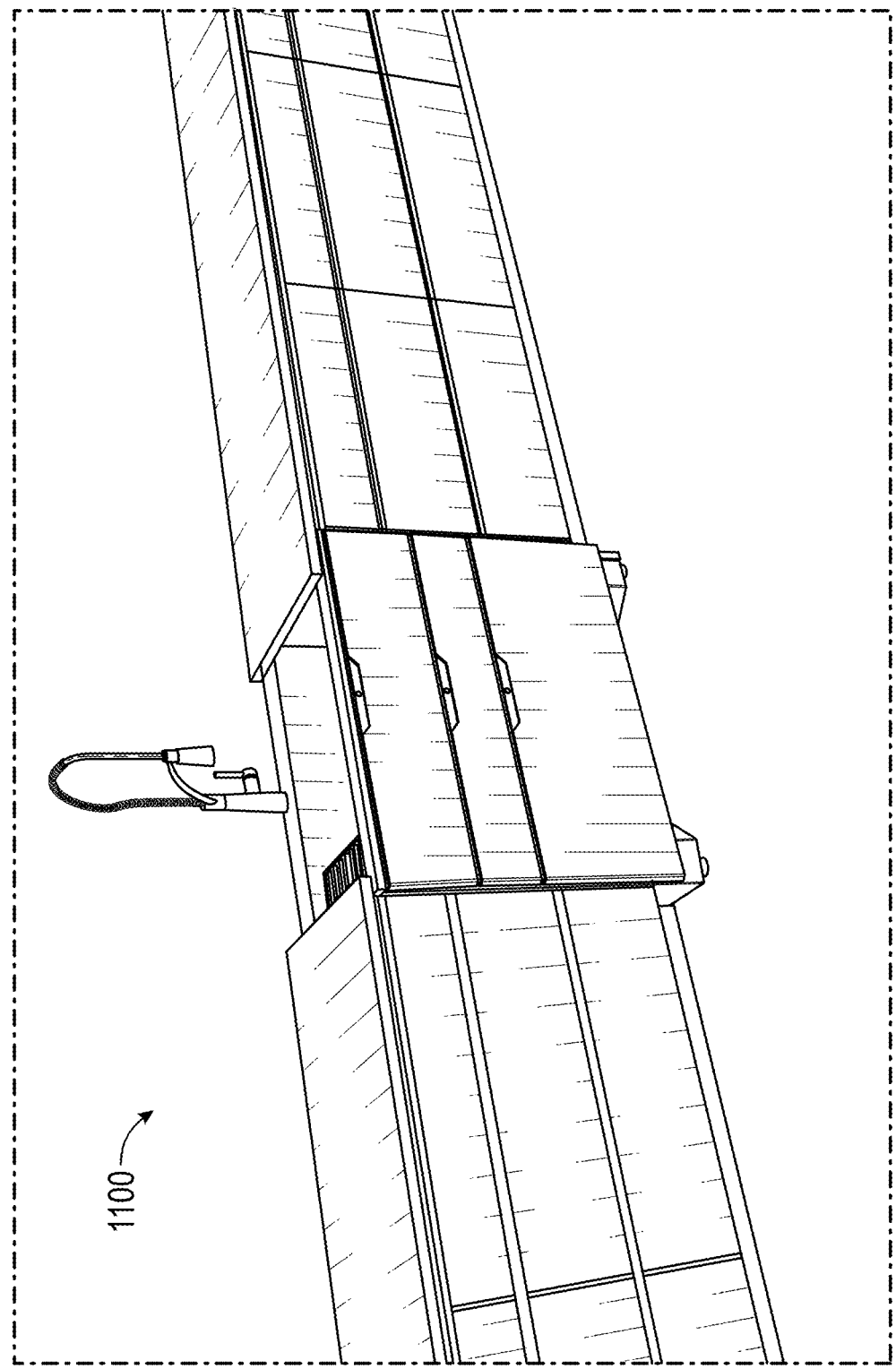

FIG. 24A illustrates the water center appliance 1100 installed in a kitchen, laundry room, or other suitable space, between counters, with the top of the water center appliance 1100 flush with the underside of the adjacent overhanging countertops. This installation includes both the top and bottom sections of the water center appliance. While the illustrated embodiment depicts the water center appliance as a different color from the surrounding cabinetry, it should be appreciated that the panels of the water center appliance are interchangeable and can be constructed of the same or similar material and color as the surrounding cabinetry for aesthetic purposes.

Figure 24B:
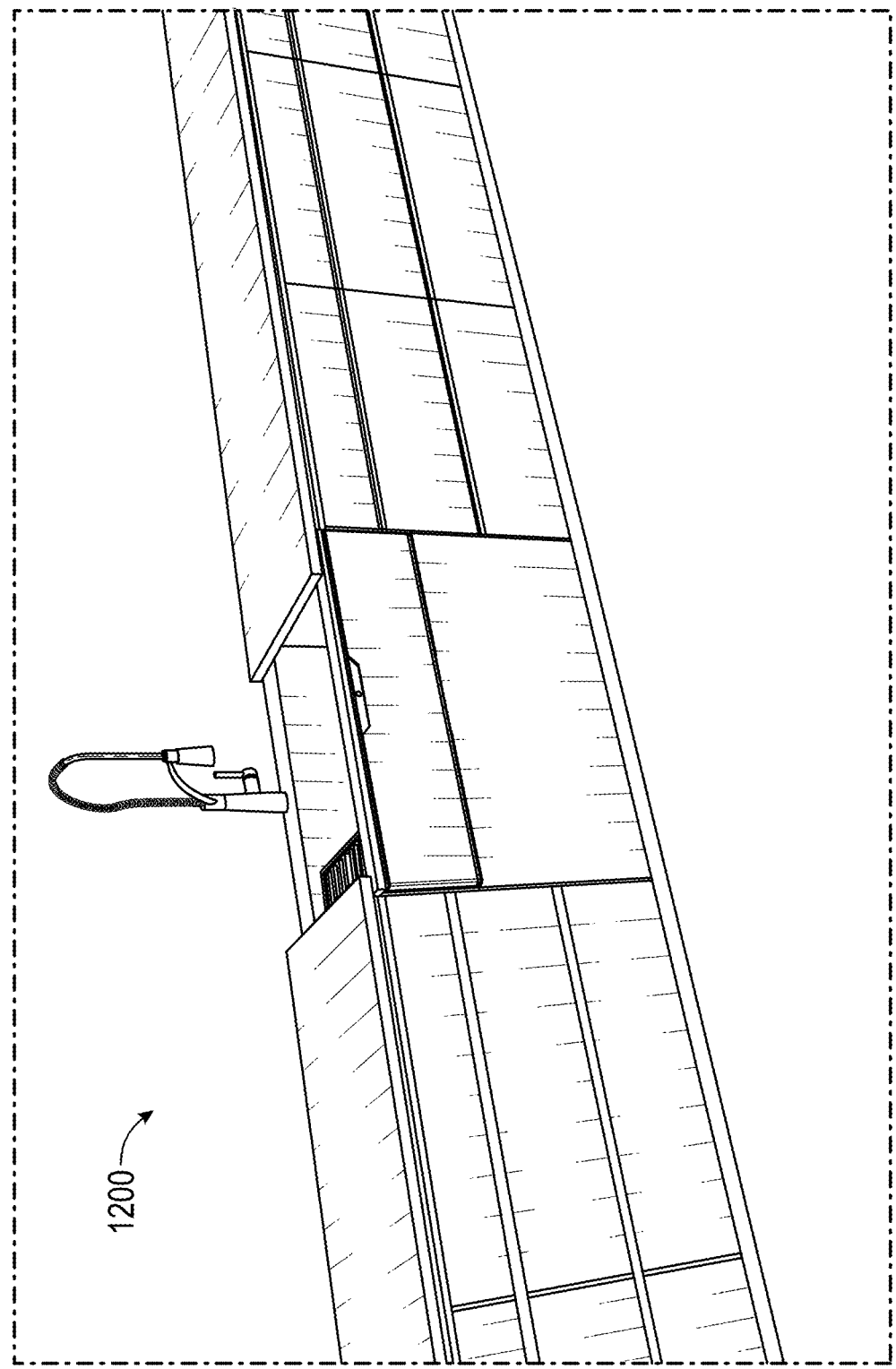

FIG. 24B illustrates an alternative installation wherein only the top section 1200 of the water center appliance 100 installed between counters. It should be appreciated that with this installation, as described above, the panels of the top section may be interchangeable to match the surrounding cabinetry.

Figure 24C:
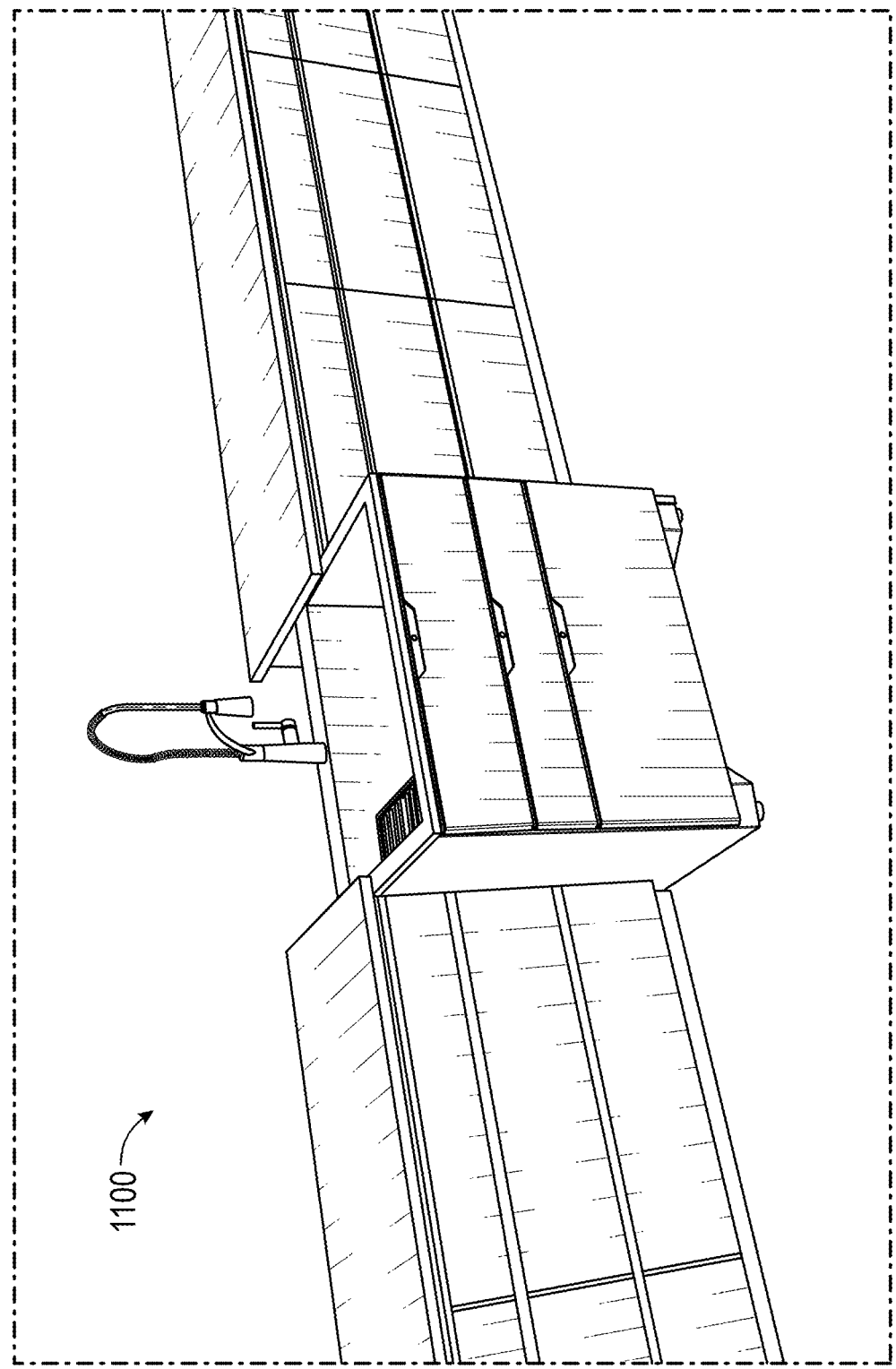
Figure 24D:
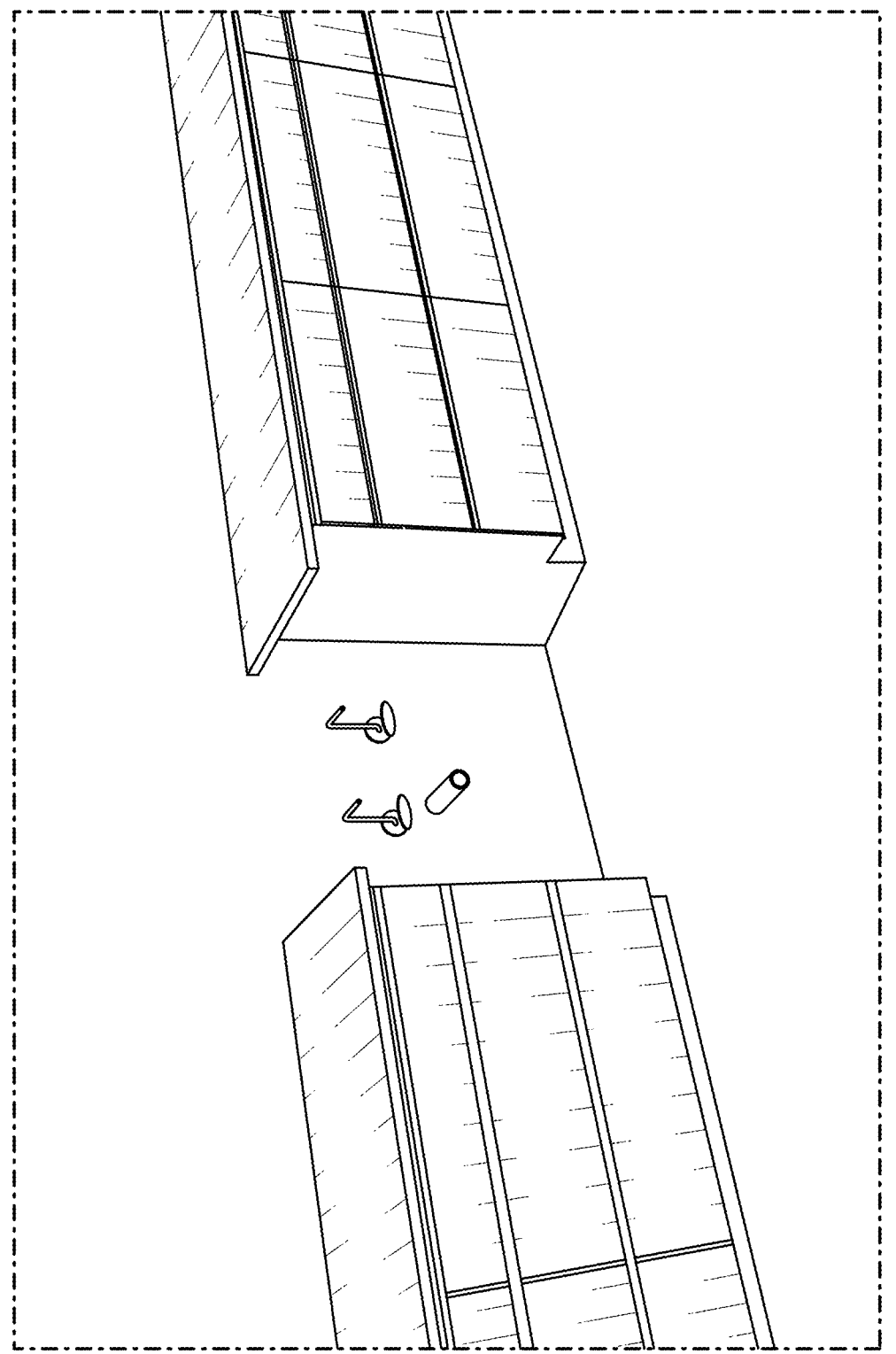

FIG. 24C illustrates the water center appliance 1100 during installation, before it has been pushed back against the wall. This illustration demonstrates the ease of the installation process facilitated by the water center appliance. For example, FIG. 24D illustrates the plumbing lines to which the water center appliance 1100 is attachable once it is inserted into the open space.

Figure 24E:
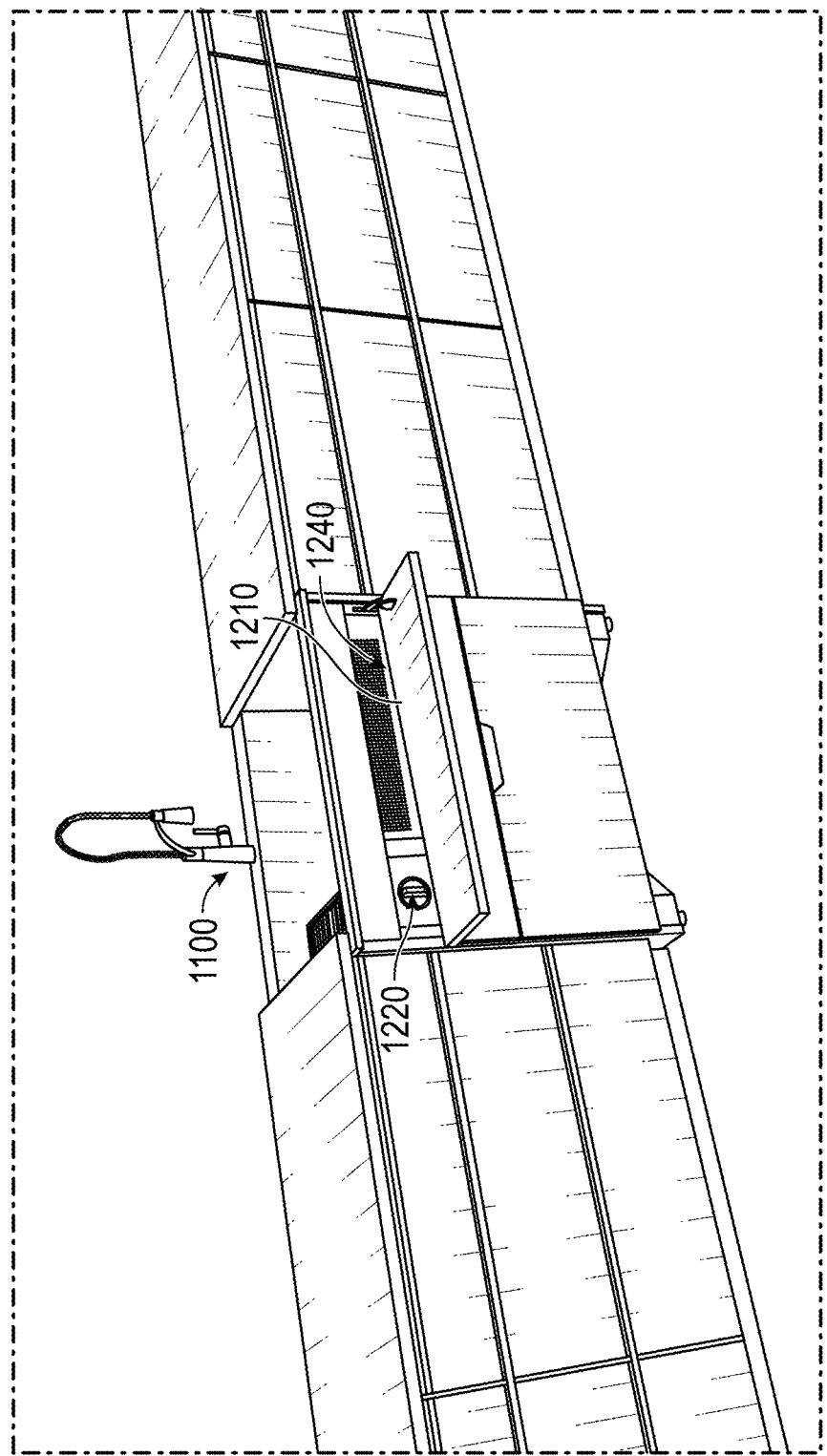
Figure 24F:
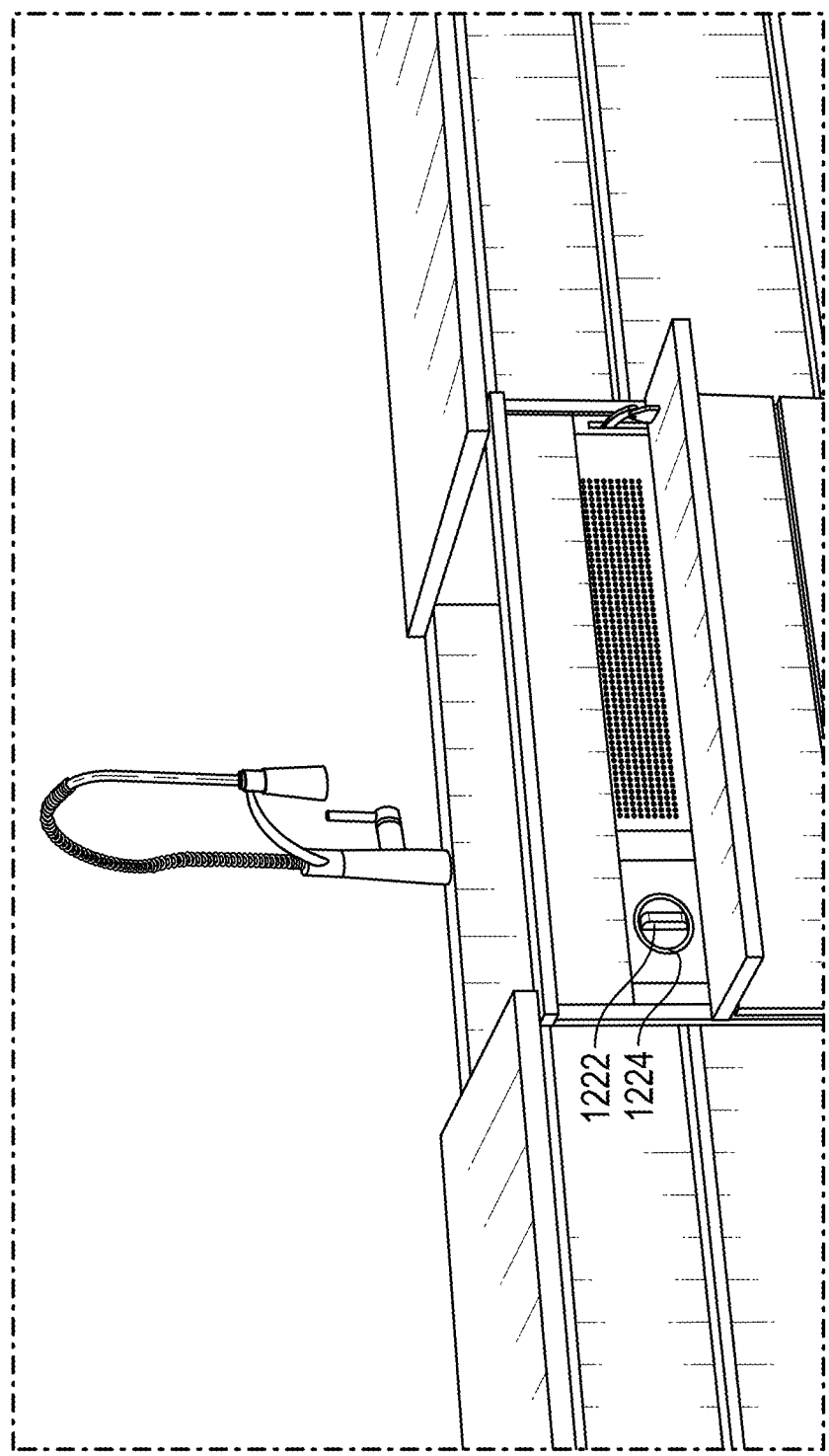

FIG. 24E illustrates an installed embodiment of the water center appliance with the front hinged door 1210 of the top section 1200 of the water center appliance 1100 in the open position. Behind the front hinged door 1210 are the water filter assembly 1220, and the storage area 1240. FIG. 24F is a close up view of the water filter assembly 1220. In this example embodiment, the circular illuminated display 1224 is dark, which indicates that the water filter 1222 should be changed.

Figure 24G:
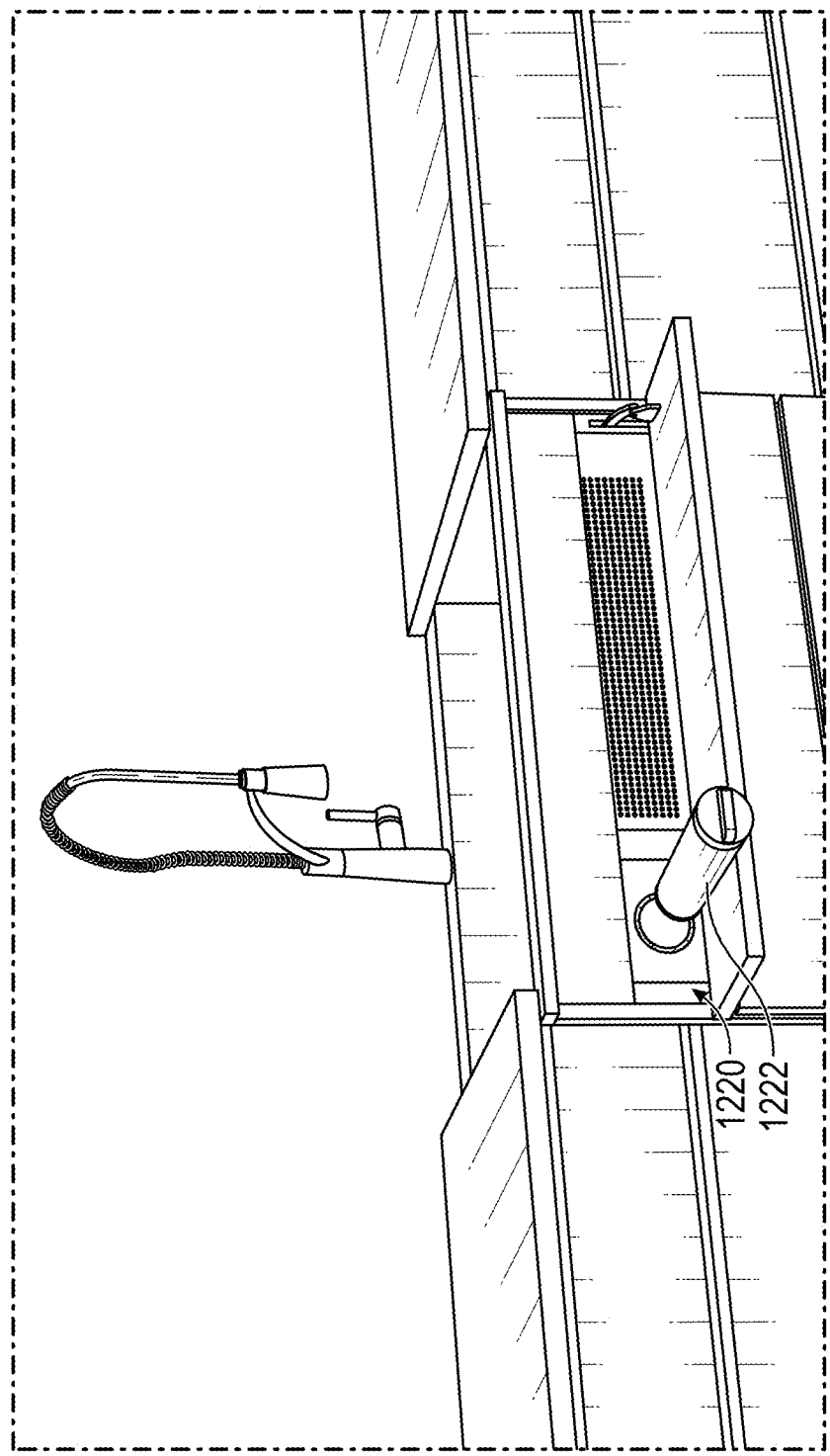

FIG. 24G illustrates the water filter assembly 1220, wherein the water filter 1222 has been removed.

Figure 24H:
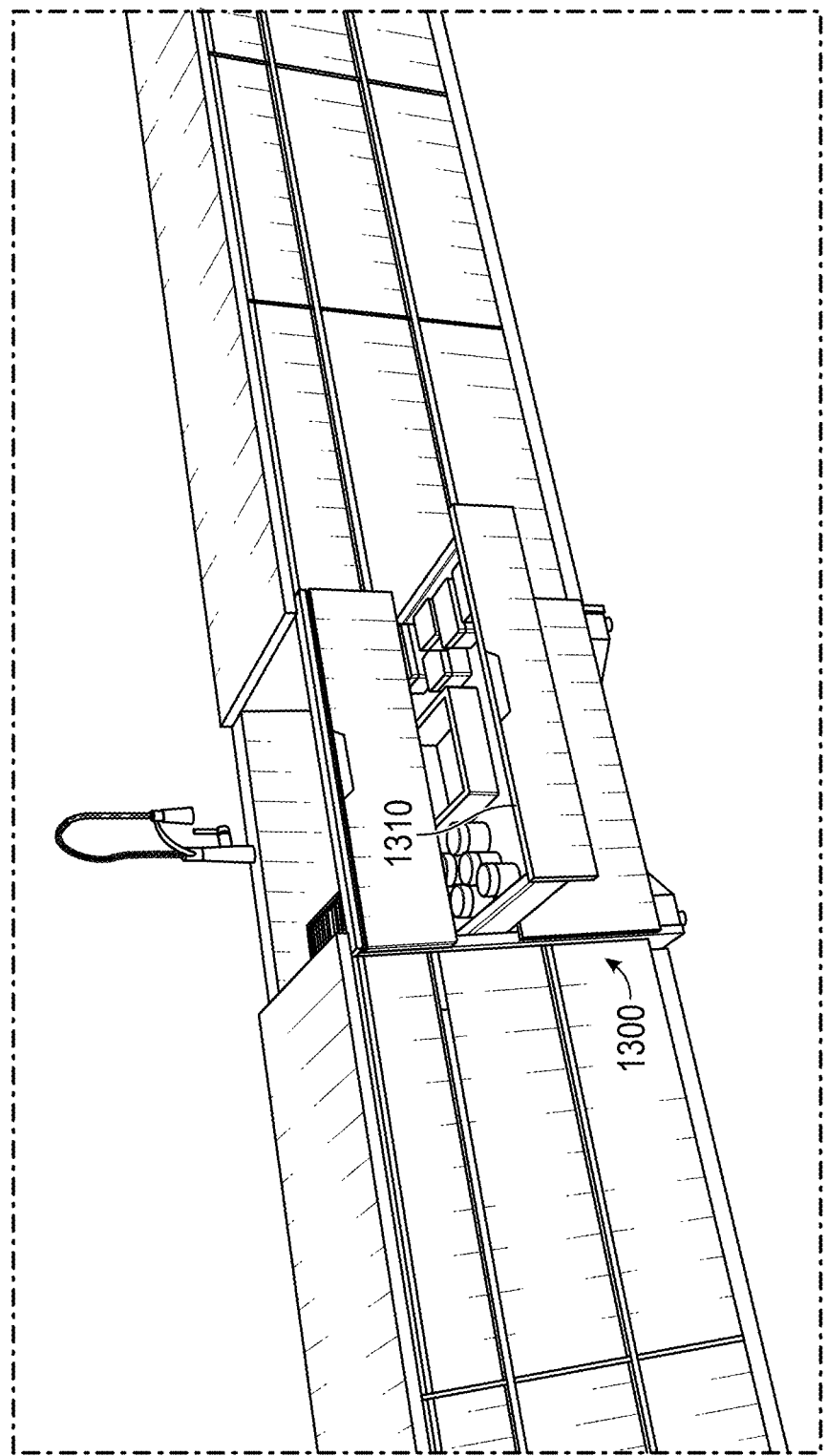

FIG. 24H illustrates an example embodiment of the first sliding drawer 1310 of the bottom section 1300 in the open position. As illustrated in this example embodiment, the first sliding drawer 1310 includes storage space for various objects, and the storage space is designed to accommodate the plumbing behind the drawer.

Figure 24I:
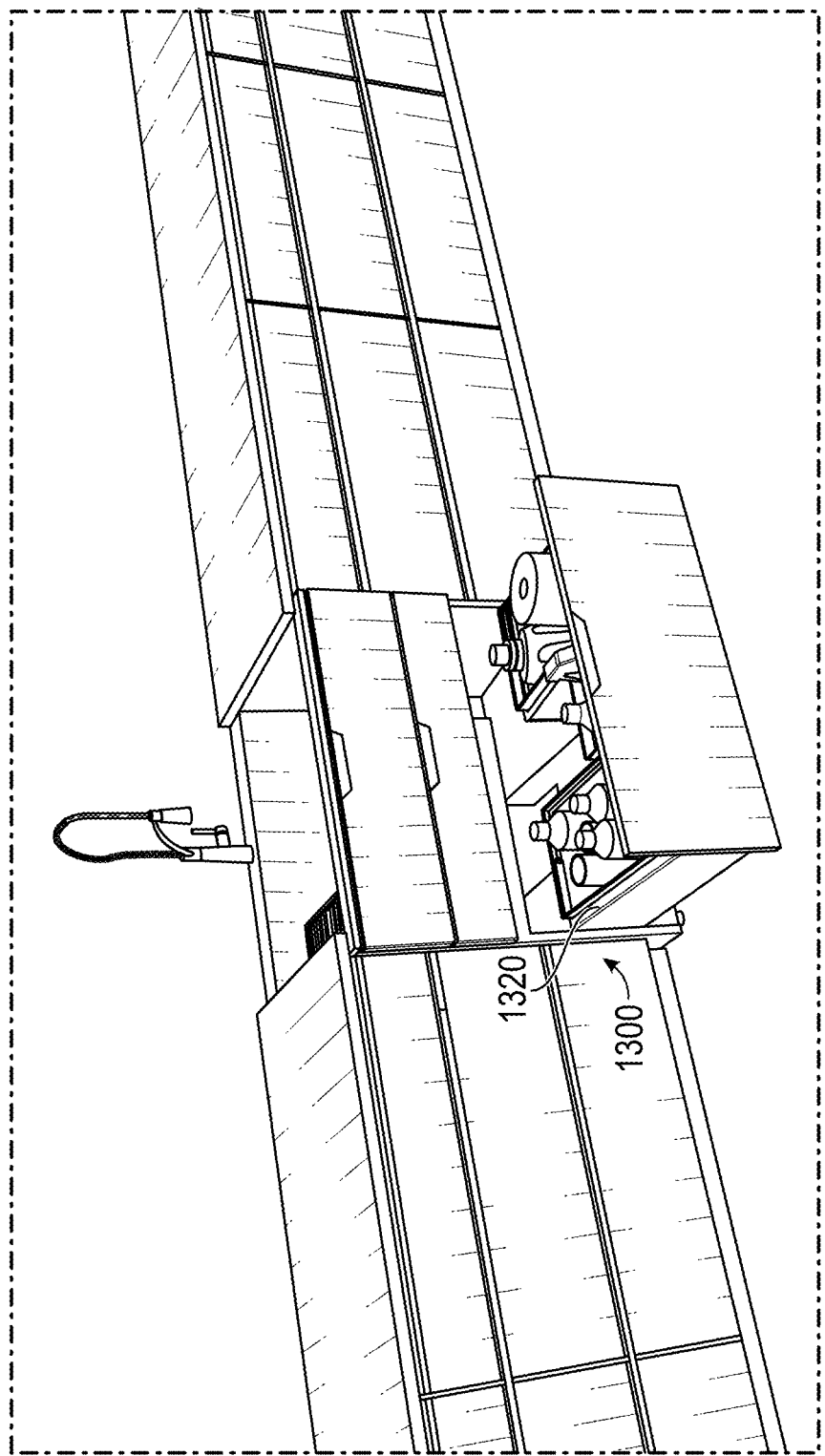
Figure 26G:
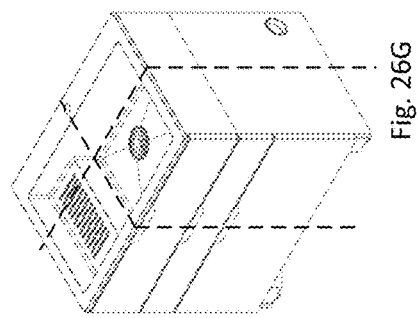
FIGS. 26A-G illustrate front, back, left, right, top, bottom, and perspective views of an example water center appliance.
Figure 26D:
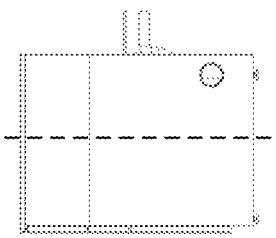
Figure 26E:
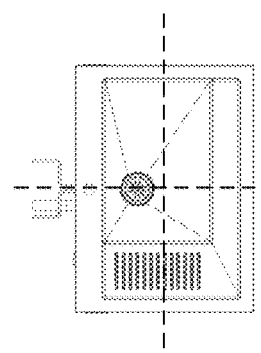
Figure 26A:
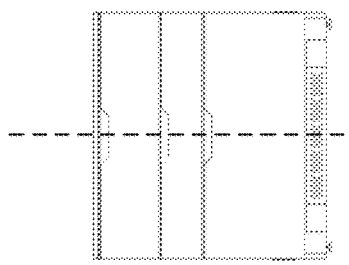
Figure 26F:
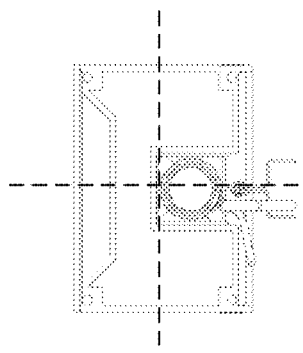
Figure 26C:
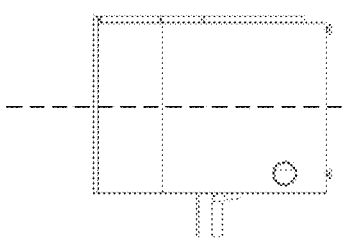
Figure 26B:
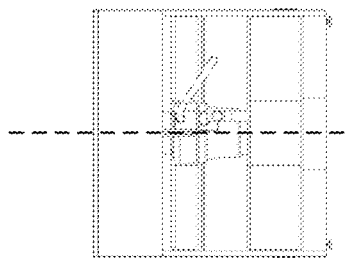
Figure 27G:
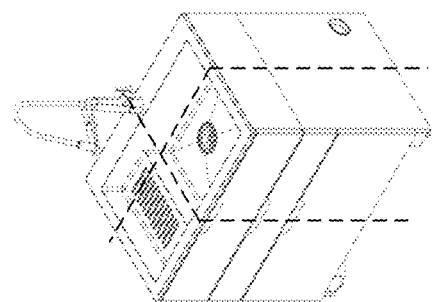
FIGS. 27A-G illustrate front, back, left, right, top, bottom, and perspective views of an example faucet and water center appliance.
Figure 27D:
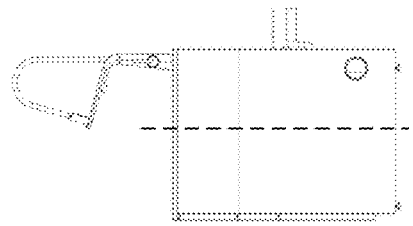
Figure 27E:
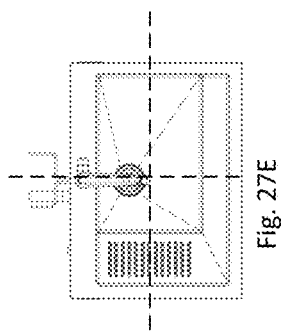
Figure 27A:
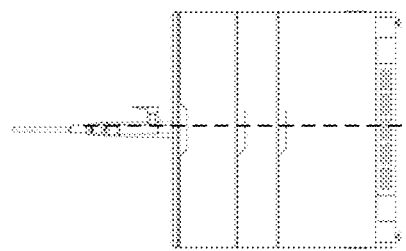
Figure 27F:
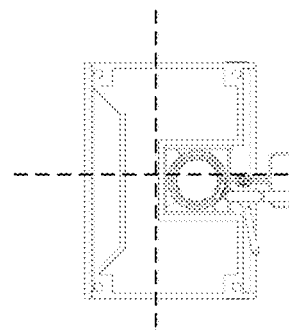
Figure 27C:
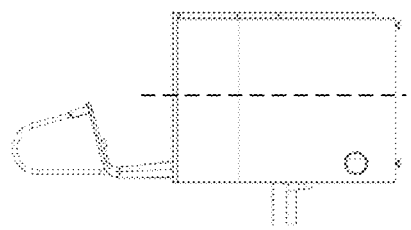
Figure 27B:
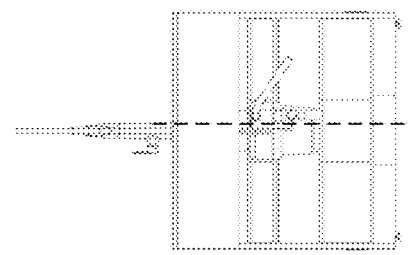
Figure 28G:
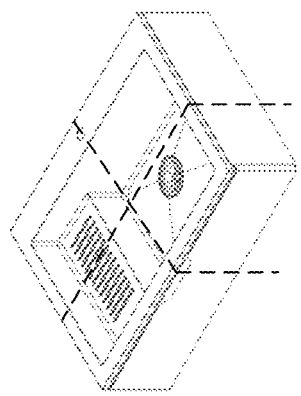
FIGS. 28A-G illustrate front, back, left, right, top, bottom, and perspective views of an example modular top section of a water center appliance.
Figure 28D:
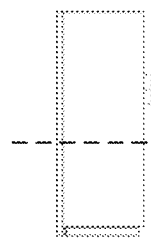
Figure 28E:
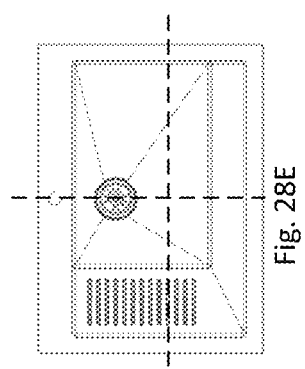
Figure 28A:
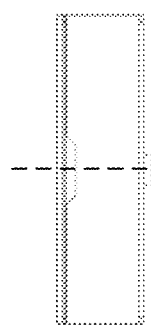
Figure 28F:
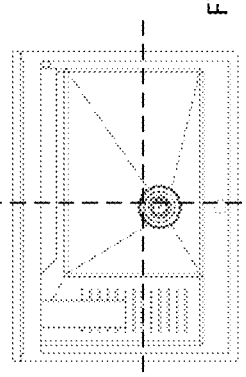
Figure 28C:
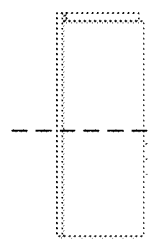
Figure 28B:
Figure 30G:
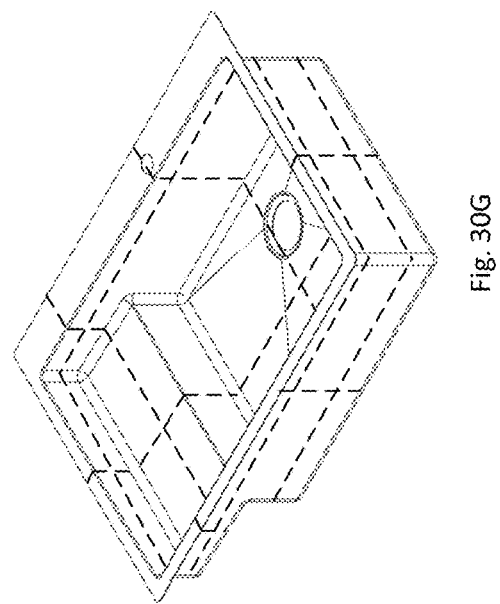
FIGS. 30A-G illustrate front, back, left, right, top, bottom, and perspective views of an example sink basin with a left ledge.
Figure 30B:
Figure 30D:
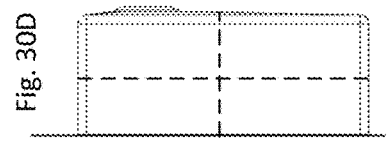
Figure 30E:
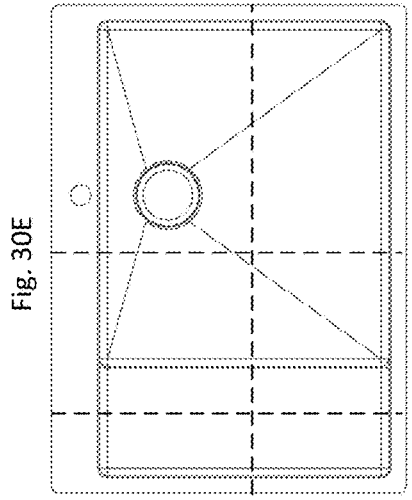
Figure 30A:
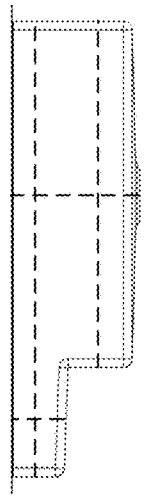
Figure 30F:
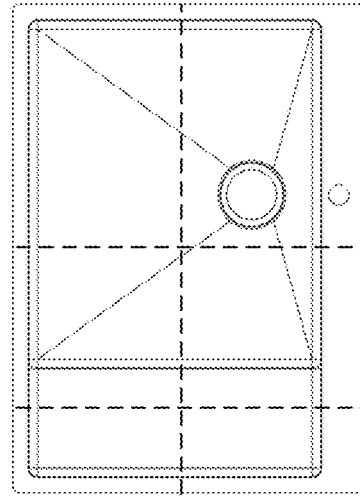
Figure 30C:
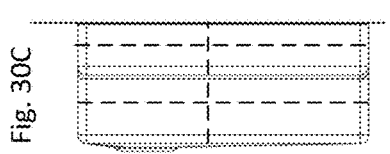
Figures 33A, 33B, 33C, 33D, 33E, 33F, 33G:
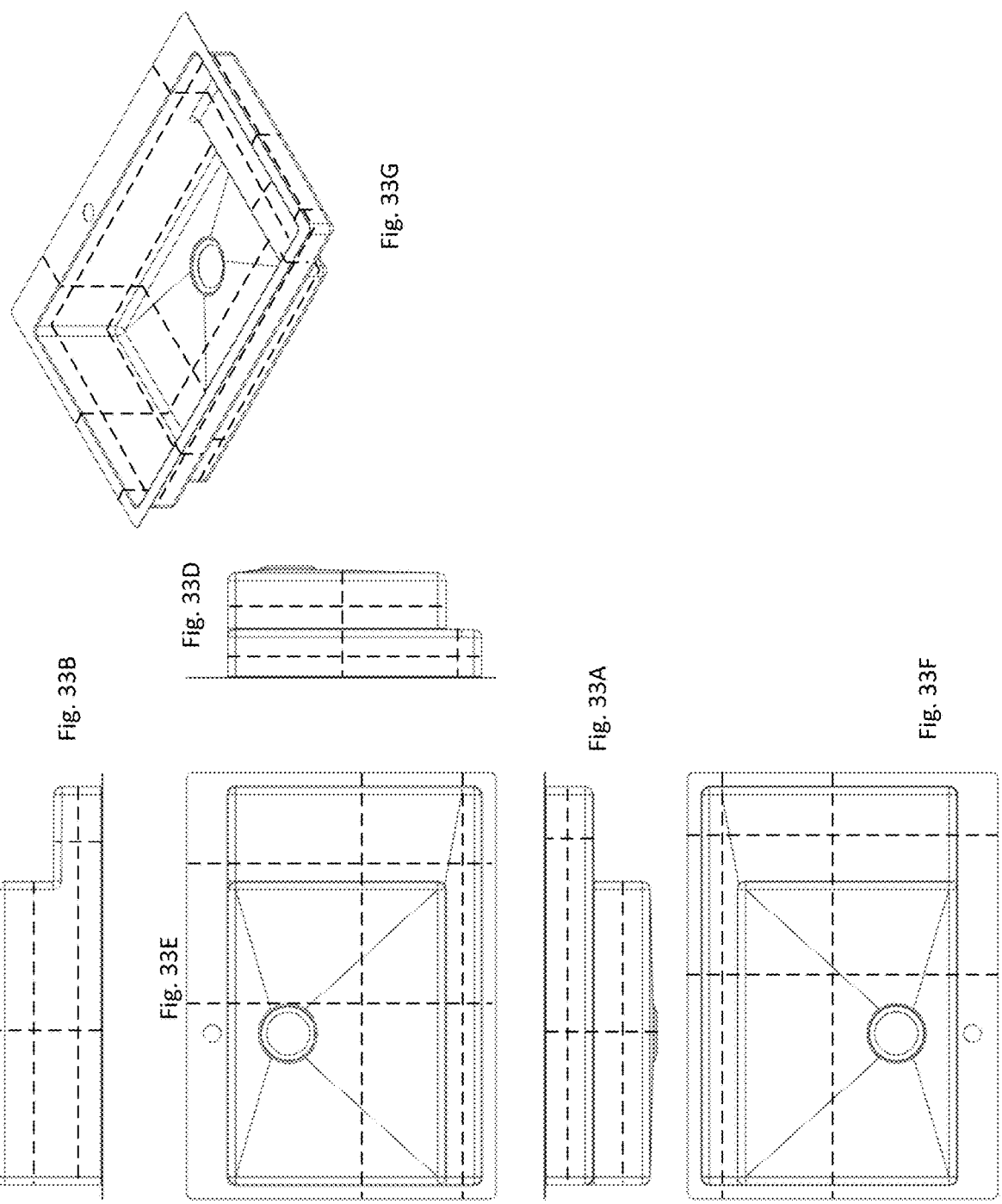
FIGS. 33A-G illustrate front, back, left, right, top, bottom, and perspective views of an example sink basin with a right and front ledge.
Figure 36G:
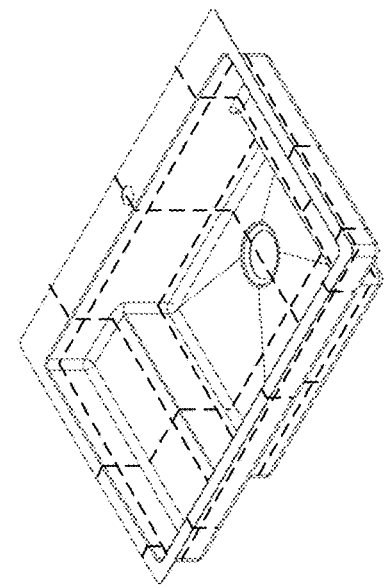
FIGS. 36A-G illustrate front, back, left, right, top, bottom, and perspective views of an example sink basin with a left, right, and front ledge.
Figure 36D:
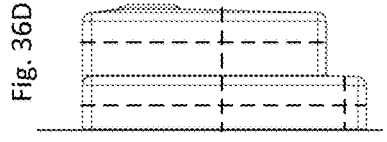
Figure 36B:
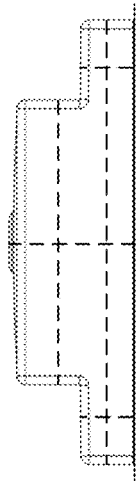
Figure 36E:
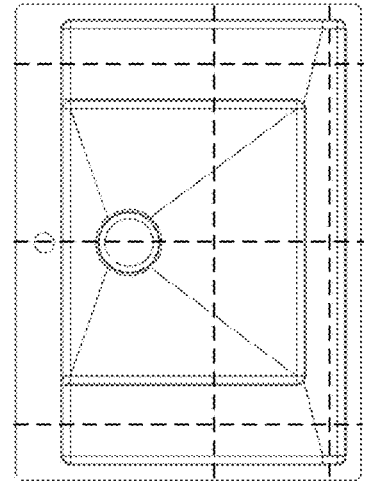
Figure 36A:
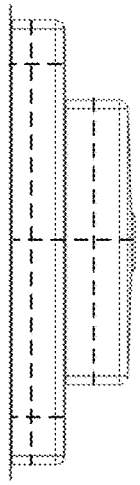
Figure 36F:
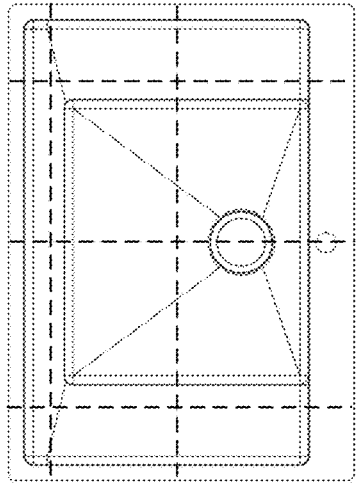
Figure 36C:
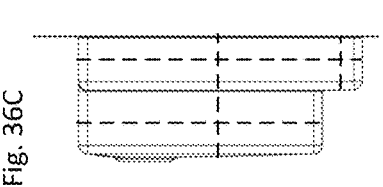

FIG. 24I illustrates the second sliding drawer 1320 of the bottom section 1300 in the open position. As illustrated in FIG. 24I, in this embodiment, the second sliding drawer is deeper than the first sliding drawer and includes a larger gap to accommodate larger objects for storage.

FIG. 24J illustrates the second sliding drawer 1320 including a plurality of organizational compartments 1322A-C that may be included and that may be sized to fit within the designed storage spaces. The organizational compartments 1322A-C may fit into the legs of the second sliding drawer 320, and may be configured to organize and store various products, such as cleaning supplies.

FIGS. 25A-37G illustrate various features, and include dashed lines. The dashed lines may indicate that the various lengths, widths, and depths of the corresponding components can vary or may change from what is shown in the Figures.

FIGS. 25A-G illustrate front, back, left, right, top, bottom, and perspective views of an example faucet, which may be similar or identical to the faucet described and shown with respect to FIGS. 23A-C.

FIGS. 26A-G illustrate front, back, left, right, top, bottom, and perspective views of an example water center appliance without a faucet. This water center appliance may be similar or identical to the water center appliance disclosed above.

FIGS. 27A-G illustrate front, back, left, right, top, bottom, and perspective views of an example faucet and water center appliance. The faucet and/or water center appliance shown in FIGS. 27A-G may be similar or identical to the faucet disclosed with respect to FIGS. 23A-C, and/or the water center appliance disclosed above.

FIGS. 28A-G illustrate front, back, left, right, top, bottom, and perspective views of an example modular top section of a water center appliance without a faucet. This modular top section may be similar or identical to the modular top section of the water center appliance disclosed above.

FIGS. 29A-G illustrate front, back, left, right, top, bottom, and perspective views of an example faucet and modular top section of a water center appliance. The faucet and/or modular top section of the water center appliance shown in FIGS. 29A-G may be similar or identical to the faucet disclosed with respect to FIGS. 23A-C, and/or the modular top section of the water center appliance disclosed above.

It should be appreciated that a water center appliance as contemplated in this disclosure can include any suitable faucet, and that the faucets disclosed herein and shown in the Figures are examples only.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure.

What is claimed is:

1. A water center appliance comprising:
   a top section, the top section including:
      a sink basin;
      a water filter assembly;
      a water inlet connection;
      an electricity connection; and
      a front hinged door configured to cover the water filter assembly when closed, and enable access to the water filter assembly when opened; and
   a bottom section, the bottom section including:
      a first sliding drawer; and
      a second sliding drawer,
   wherein the first sliding drawer and the second sliding drawer are shaped to accommodate one or more components of the top section.

2. The water center appliance of claim 1, wherein the front hinged door is rotatable via a hinge connected to a bottom portion of the front hinged door.

3. The water center appliance of claim 1, wherein the water filter assembly includes a display configured to indicate a health of a water filter of the water filter assembly.

4. The water center appliance of claim 3, wherein the display comprises a circular display configured to change a color displayed based on the health of the water filter.

5. The water center appliance of claim 1, further comprising a display indicating a usage of the water center appliance.

6. The water center appliance of claim 5, wherein the display comprises an LCD display, wherein the LCD display is positioned behind the front hinged door of the top section.

7. The water center appliance of claim 1, wherein the top section further includes a disposal connected to the sink basin.

8. The water center appliance of claim 7, wherein the first sliding drawer and the second sliding drawer are shaped to accommodate the disposal.

9. The water center appliance of claim 1, wherein the top section further includes a dishwasher connection configured to couple to a dishwasher.

10. A modular water center appliance comprising:
    a top section, the top section including:
        a sink basin;
        a water filter assembly;
        a water inlet connection;
        an electricity connection;
        a front hinged door configured to cover the water filter assembly when closed, and enable access to the water filter assembly when opened; and
        a display configured to indicate a usage of the water center appliance, wherein the display is positioned behind the front hinged door when the front hinged door is closed; and
    a bottom section including storage shaped to accommodate one or more components of the top section.

11. The modular water center appliance of claim 10, wherein the water filter assembly includes a second display configured to indicate a health of a water filter of the water filter assembly.

12. The modular water center appliance of claim 11, wherein the second display comprises a circular display extending at least partially around the water filter, configured to change a color displayed based on the health of the water filter.

13. The modular water center appliance of claim 10, wherein the display comprises an LCD display, wherein the LCD display is positioned behind the front hinged door of the top section.

14. The modular water center appliance of claim 10, wherein the top section further includes a disposal connected to the sink basin.

15. The modular water center appliance of claim 10,
    wherein the bottom section is attachable to the top section, and wherein the storage of the bottom section includes:
        a first sliding drawer; and
        a second sliding drawer,
    wherein the first sliding drawer and the second sliding drawer are shaped to accommodate the one or more components of the top section.

16. The modular water center appliance of claim 15, wherein the first sliding drawer and the second sliding drawer are U-shaped to accommodate a disposal connected to the sink basin.

17. The modular water center appliance of claim 10, wherein the top section further includes a dishwasher connection configured to couple to a dishwasher.

18. The modular water center appliance of claim 10, further comprising a faucet coupled to the water filter assembly, the faucet including:
    a display configured to indicate information corresponding to usage of the modular water center appliance.

* * * * *